(12) United States Patent
Hart et al.

(10) Patent No.: US 12,155,206 B2
(45) Date of Patent: Nov. 26, 2024

(54) TRANSIENT CONTROL FOR A NETWORK OF DISTRIBUTED GRID FORMING INVERTER-BASED RESOURCES

(71) Applicant: General Electric Company, Schenectady, NY (US)

(72) Inventors: Philip Joseph Hart, Rexford, NY (US); Maozhong Gong, Latham, NY (US); Hanchao Liu, Troy, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 366 days.

(21) Appl. No.: 17/751,979

(22) Filed: May 24, 2022

(65) Prior Publication Data

US 2023/0387683 A1 Nov. 30, 2023

(51) Int. Cl.
*H02J 3/00* (2006.01)
*H02J 3/38* (2006.01)

(52) U.S. Cl.
CPC .......... *H02J 3/00125* (2020.01); *H02J 3/004* (2020.01); *H02J 3/381* (2013.01); *H02J 2203/20* (2020.01); *H02J 2300/28* (2020.01)

(58) Field of Classification Search
CPC . F03D 7/0284; H02J 2203/20; H02J 2300/28; H02J 3/001; H02J 3/00125;
(Continued)

(56) References Cited

U.S. PATENT DOCUMENTS 5,798,633 A 8/1998 Larsen et al.
7,804,184 B2 9/2010 Yuan et al.
(Continued)

FOREIGN PATENT DOCUMENTS

CN 107681662 A * 2/2018
CN 112928938 A 6/2021
(Continued)

OTHER PUBLICATIONS

Cheema et al., Modification in active power-frequency loop of virtual synchronous generator to improve the transient stability, 2021, Electrical Power and Energy Systems 128, p. 1-9. (Year: 2121).*

(Continued)

*Primary Examiner* — Kidest Bahta
(74) *Attorney, Agent, or Firm* — Dority & Manning, P.A.

(57) ABSTRACT

A method for controlling a network of inverter-based resources connected to a power grid during a disturbance includes employing a distributed transient virtual impedance algorithm among the network of inverter-based resources (IBRs) after a start of or in anticipation of the disturbance. The distributed transient virtual impedance algorithm includes determining, via at least one of one or more power flow equations, one or more energy function equations, and one or more estimated power capabilities, a virtual impedance control parameter and a modified power reference for one or more of the IBRs. Further, the method includes activating the virtual impedance control parameter and the modified power reference for one or more of the IBRs to ride through the disturbance in a manner that also optimizes use of the one or more estimated power capabilities for one or more of the IBRs and that preserves synchronism between at least two of the inverter-based resources and/or between at least one of the inverter-based resources and the power grid. Thus, the virtual impedance control parameter temporarily reduces voltage proportionally with output current for one or more of the IBRs, thereby resulting in a reduction of local power output of one or more of the IBRs.

20 Claims, 16 Drawing Sheets

(58) Field of Classification Search
CPC ....... H02J 3/004; H02J 3/381; H02P 2101/15; H02P 9/007; H02P 9/102
See application file for complete search history.

(56) References Cited

U.S. PATENT DOCUMENTS

| | | | | |
|---|---|---|---|---|
| 8,693,228 | B2* | 4/2014 | Matan | H02J 3/46 323/207 |
| 9,270,194 | B2 | 2/2016 | Brogan et al. | |
| 10,756,536 | B2 | 8/2020 | Kral et al. | |
| 10,879,785 | B2 | 12/2020 | Shuai et al. | |
| 2012/0292904 | A1* | 11/2012 | Tarnowski | H02P 9/42 290/44 |
| 2014/0049233 | A1* | 2/2014 | Rodriguez Cortes | H02M 1/12 323/234 |

FOREIGN PATENT DOCUMENTS

| | | | |
|---|---|---|---|
| JP | 6523446 B2 | 5/2019 | |
| WO | WO2021/145877 A1 | 7/2021 | |

OTHER PUBLICATIONS

European Search Report Corresponding to EP23172312.3 on Oct. 20, 2023.

Buraimoh et al., Fault Ride-Through Analysis of Current- and Voltage-Source Models of Grid Supporting Inverter-Based Microgrid, XP011860883, IEEE Canadian Journal of Electrical and Computer Engineering, vol. 44, Issue 2, 2021, 189-198. https://ieeexplore.ieee.org/document/9456061.

Jin et al., A DQ-Frame Asymmetrical Virtual Impedance Control for Enhancing Transient Stability of Grid-Forming Inverters, XP011895288, IEEE Transactions on Power Electronics, Institute of Electrical and Electronics Engineers, vol. 37, Issue 4, 2021, 4535-4544. https://iecexplore.ieee.org/document/9599399.

Andrade et al., Study of Large-Signal Stability of an Inverter-Based Generator Using a Lyapunov Function, 40$^{th}$ Annual Conference of the IEEE Industrial Electronics Society, 2014, pp. 1840-1846. (Abstract Only). https://ieeexplore.ieee.org/document/7048752.

Awal et al., Unified Virtual Oscillator Control for Grid-Forming and Grid-Following Converters, IEEE Journal of Emerging and Selected Topics in Power Electronics, vol. 9, Issue 4, Aug. 2021, pp. 4573-4586. (Abstract Only) https://ieeexplore.ieee.org/abstract/document/9203895.

Bergen et al., A Structure Preserving Model for Power System Stability Analysis, IEEE Transactions on Power Apparatus and Systems, vol. PAS-100, Issue 1, Jan. 1981, pp. 25-35. (Abstract Only) https://ieeexplore.ieee.org/document/4110445.

Brabandere et al., Small-Signal Stability of Grids with Distributed Low-Inertia Generators Taking into Account Line Phasor Dynamics, 18$^{th}$ International Conference and Exhibition on Electricity Distribution, 2005. (Abstract Only) https://ieeexplore.ieee.org/document/5428013.

Cheema et al., Modification in Active Power-Frequency Loop of Virtual Synchronous Generator to Improve the Transient Stability, International Journal of Electrical Power & Energy Systems, 106668, vol. 128, Jun. 2021. (Abstract Only) https://doi.org/10.1016/j.ijepes.2020.106668.

Choi et al., Cascading Collapse of a Large-Scale Mixed Source Microgrid Caused by Fast-Acting Inverter-Based Distributed Energy Resources, IEEE Transaction on Industry Applications, vol. 54, Issue 6, Nov.-Dec. 2018, pp. 5727-5735. (Abstract Only) https://ieeexplore.ieee.org/document/8409294.

D'Arco et al., Virtual Synchronous Machines—Classification of Implementations and Analysis of Equivalence to Droop Controllers for Microgrids, 2013 IEEE Grenoble Conference, 2013, pp. 1-7. (Abstract Only) https://ieeexplore.ieee.org/document/6652456.

Davy et al., Lyapunov Functions for Multimachine Power Systems with Dynamic Loads, IEEE Transactions on Circuits and Systems I: Fundamental Theory and Applications, vol. 44, Issue 9, Sep. 1997, pp. 796-812. (Abstract Only) https://ieeexplore.ieee.org/document/622983.

Dedeoglu et al., Grid-Supporting Three-Phase Inverters with Inherent Root Mean Square Current Limitation Under Balanced Grid Voltage Sags, IEEE Transactions on Industrial Electronics, vol. 68, Issue 11, Nov. 2021, pp. 11379-11389. (Abstract Only) https://ieeexplore.ieee.org/document/9248628.

Demarco et al., A Generalized Eigenvalue Perturbation Approach to Coherency, Proceedings of International Conference Control Applications, 1995, pp. 611-617. (Abstract Only) https://ieeexplore.ieee.org/document/555802.

Du et al., Voltage-Source Control of PV Inverter in a CERTS Microgrid, IEEE Transactions on Power Delivery, vol. 29, No. 4, Feb. 2014, pp. 1726-1734. (Abstract Only) https://ieeexplore.ieee.org/document/6740077.

Erickson et al., Improved Power Control Bandwidth of Grid-Forming Sources in a CERTS Microgrid, IEEE Energy Conversion Congress and Exposition (ECCE), 2012, pp. 2366-2373. (Abstract Only) https://ieeexplore.ieee.org/abstract/document/6342459.

Eskandari et al., On the Impact of Fault Ride-Through on Transient Stability of Autonomous Microgrids: Nonlinear Analysis and Solution, IEEE Transactions on Smart Grid, vol. 12, Issue 2, Mar. 2021, pp. 999-1010. (Abstract Only) https://ieeexplore.ieee.org/document/9220790.

Gkountaras et al., Evaluation of Current Limiting Methods for Grid Forming Inverters in Medium Voltage Microgrids, 2015 IEEE Energy Conversion Congress and Exposition (ECCE), Sep. 2015, pp. 1223-1230. (Abstract Only) https://ieeexplore.ieee.org/document/7309831.

Groß et al., Projected Grid-Forming Control for Current-Limiting of Power Converters, Annual Allerton Conference on Communication, Control, and Computing, Sep. 2019, pp. 326-333. (Abstract Only) https://ieeexplore.ieee.org/document/8919856.

Hart et al., Coherency Identification and Aggregation in Grid-Forming Droop-Controlled Inverter Networks, IEEE Transactions on Industry Applications, vol. 55, Issue 3, May-Jun. 2019, pp. 2219-2231. (Abstract Only) h tps lore 1/8606184.

Hart et al., Energy Function for a Grid-Tied, Droop-Controlled Inverter, 2014 North American Power Symposium (NAPS), Sep. 2014, pp. 1-6. (Abstract Only) https://ieeexplore.ieee.org/document/6965437.

Hart et al., Enforcing Coherency in Droop-Controlled Inverter Networks Through Use of Advanced Voltage Regulation and Virtual Impedance, IEEE Energy Conversion Congress and Exposition (ECCE), 2017, pp. 3367-3374. (Abstract Only) https://ieeexplore.ieee.org/abstract/document/8096605.

Hart, Reduced-Order Modeling and Analysis of Droop-Controlled, Inverter-Based Distributed Generation Networks, ProQuest Ph.D. Dissertations and Theis, The University of Wisconsin—Madison, vol. 79-04(E), Section B, 2017, 370 Pages. (Abstract Only) https://ui.adsabs.harvard.edu/abs/2017PbDT.......176H/abstract.

Kabalan et al., Nonlinear Lyapunov Stability Analysis of Seven Models of a DC/AC Droop Controlled Inverter Connected to an Infinite Bus, IEEE Transactions on Smart Grid, vol. 10, Issue 1, Jan. 2019, pp. 772-781. (Abstract Only) https://ieeexplore.ieee.org/document/8036269.

Klump et al., A New Method for Finding Low-Voltage Power Flow Solutions, 2000 Power Engineering Society Summer Meeting (Cat. No. 00CH37134), vol. 1, 2000, pp. 593-597. (Abstract Only) https://ieeexplore.ieee.org/document/867653.

Kron, Tensor Analysis of Networks, John Wiley & Sons, New York, 1939. (BOOK).

Li et al., A New Current Limiting and Overload Protection Scheme for Distributed Inverters in Microgrids Under Grid Faults, IEEE Transactions on Industry Applications, vol. 57, Issue 6, Nov.-Dec. 2021, pp. 6362-6374. (Abstract Only) https://ieeexplore.ieee.org/document/9511809.

Mathworks, Matlab (MATrix LABoratory) for Artificial Intelligence, 2021. Accessed Dec. 1, 2021 online from https://www.mathworks.com (Web Link Only).

Mitra et al., A Homotopy-Based Method for Robust Computation of Controlling Unstable Equilibrium Points, IEEE Transactions on

(56) References Cited

OTHER PUBLICATIONS

Power Systems, vol. 35, Issue 2, Mar. 2020, pp. 1422-1431. (Abstract Only) https://ieeexplore.ieee.org/document/8846055.

Pai, Energy Function Analysis for Power System Stability, Part of The Kluwer International Series in Engineering and Computer Science book series, 1989. (Web Link Only) https://link.spring.com/book/10.1007/978-1-4613-1635-0.

Paquette et al., Virtual Impedance Current Limiting for Inverters in Microgrids with Synchronous Generators, IEEE Transactions on Industry Applications, vol. 51, Issue 2, Mar.-Apr. 2015, pp. 1630-1638. (Abstract Only) https://ieeexplore.ieee.org/abstract/document/6872529https://www.semanticscholar.org/paper/Virtual-Impedance-Current-Limiting-for-Inverters-in-Paquette-Divan/64a504d3d04a522f9b9b2c5d3938ae165c66bd6d#paper-header.

Pattabiraman et al., Transient Stability Modeling of Droop-Controlled Grid-Forming Inverters with Fault Current Limiting, 2020 IEEE Power & Energy Society General Meeting (PEGSM), Aug. 2020, pp. 1-5. (Abstract Only) https://ieeexplore.ieee.org/document/9281712.

Piagi, Microgrid Control, Dissertation or Thesis, University of Wisconsin-Madison, 2005. (Abstract Only).

Plexim, Plexim Electrical Engineering Software. Available online at https:/www.plexim.com/ (Weblink Only).

Qoria et al., Critical Clearing Time Determination and Enhancement of Grid-Forming Converters Embedding Virtual Impedance as Current Limitation Algorithm, IEEE Journal of Emerging and Selected Topics in Power Electronics, vol. 8, Issue 2, Jun. 2020, pp. 1050-1061. (Abstract Only) https://ieeexplore.ieee.org/document/8931732.

Qoria et al., Current Limiting Algorithms and Transient Stability Analysis of Grid-Forming VSCs, Electric Power Systems Research, vol. 189, Dec. 2020. (Abstract Only) https://www.sciencedirect.com/science/article/abs/pii/S0378779620305290.

Rosso et al., On the Implementation of an FRT Strategy for Grid-Forming Converters Under Symmetrical and Asymmetrical Grid Faults, IEEE Transactions on Industry Applications, vol. 57, Issue 5, 2021, pp. 4385-4397. (Abstract Only) https://ieeexplore.ieee.org/document/9477148.

Schiffer et al., Conditions for Stability of Droop-Controlled Inverter-Based Microgrids, Automatica, vol. 50, Issue 10, Oct. 2014, pp. 2457-2469. (Abstract Only) https://www.sciencedirect.com/scince/article/abs/pii/S0005109814003100.

Shi et al., Low-Voltage Ride-Through Control Strategy for a Virtual Synchronous Generator Based on Smooth Switching, IEEE Access, vol. 6, 2018, pp. 2703-2711. (Abstract Only) https://ieeexplore.ieee.org/document/8225632.

Shuai et al., Transient Angle Stability of Virtual Synchronous Generators Using Lyapunov's Direct Method, IEEE Transactions on Smart Grid, vol. 10, Issue 4, Jul. 2019, pp. 4648-4661. (Abstract Only) https://ieeexplore.ieee.org/document/8444083.

Simpson-Porco et al., Synchronization and Power Sharing for Droop-Controlled Inverters in Islanded Microgrids, Automatica, vol. 49, Issue 9, Sep. 2013, pp. 2603-2611. (Abstract Only) https://www.sciencedirect.com/science/article/abs/pii/S0005109813002884.

Tang et al., Coordinated Control of Adaptive Damping and Additional Torque for Transient Stability Improvement of Virtual Synchronous Generator, 2021 IEEE 4th International Conference on Computing, Power and Communication Technologies (GUCON), 2021, pp. 1-5. (Abstract Only) https://ieeexplore.ieee.org/abstract/document/9573550.

Taul et al., Current Limiting Control with Enhanced Dynamics of Grid-Forming Converters During Fault Conditions, IEEE Journal of Emerging and Selected Topics in Power Electronics, vol. 8, No. 2, Jun. 2020, pp. 1062-1073. https://ieeexplore.ieee.org/stamp/stamp.jsp?tp=&arnumber=8779657.

Varaiya et al., Direct Methods for Transient Stability Analysis of Power Systems: Recent Results, Proceedings of the IEEE, vol. 73, Issue 12, Dec. 1985, pp. 1703-1985. (Abstract Only) https://ieeexplore.ieee.org/abstract/document/1457634.

Vilathgamuwa et al., Protection of Microgrids During Utility Voltage Sags, IEEE Transactions on Industrial Electronics, vol. 53, Issue 5, Oct. 2006, pp. 1427-1436. (Abstract Only) https://ieeexplore.ieee.org/document/1705634.

Wu et al., A Mode-Adaptive Power-Angle Control Method for Transient Stability Enhancement of Virtual Synchronous Generators, IEEE Journal of Emerging and Selected Topics in Power Electronics, vol. 8, Issue 2, Jun. 2020, pp. 1034-1049. (Abstract Only) https://ieeexplore.ieee.org/document/9016216.

Xin et al., Synchronous Instability Mechanism of P-f Droop-Controlled Voltage Source Converter Caused by Current Saturation, IEEE Transactions on Power Systems, vol. 31, Issue 6, Nov. 2016, pp. 5206-5207. (Abstract Only) https://ieeexplore.ieee.org/document/7406768.

Xiong et al., Transient Damping Method for Improving the Synchronization Stability of Virtual Synchronous Generators, IEEE Transactions on Power Electronics, vol. 36, Issue 7, Jul. 2021, pp. 7820-7831. (Abstract Only) https://ieeexplore.ieee.org/document/9437123.

Zhang et al., Coordinated Utilization of Adaptive Inertia Control and Virtual Impedance Regulation for Transient Performance Increase of VSG Under Different Faults, 2021 6th Asia Conference on Power and Electrical Engineering (ACPEE), Apr. 2021, pp. 838-843. (Abstract Only) https://ieeexplore.ieee.org/document/9437123.

Zheng et al., Model Predictive Control-Based Virtual Inertia Emulator for an Islanded Alternating Current Microgrid, IEEE Transactions on Industrial Electronics, vol. 68, Issue 8, Aug. 2021, pp. 7167-7177. (Abstract Only) https://ieeexplore.ieee.org/document/9138790.

Zhong et al., Transient Stability Enhancement for Virtual Synchronous Generator by Combining Direct Power Control, IEEE Energy Conversion Congress and Exposition (ECCE), 2021, pp. 323-328. (Abstract Only) https://ieeexplore.ieee.org/document/9595568.

\* cited by examiner

TRANSIENT CONTROL FOR A NETWORK OF DISTRIBUTED GRID FORMING INVERTER-BASED RESOURCES

FIELD

The present disclosure relates generally to inverter-based resources, such as wind turbine generators and, more particularly, to systems and methods for controlling a network of inverter-based resources connected to a power grid during a large disturbance.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Furthermore, many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g., the turbine control portion of a wind turbine. This is conveyed as a torque reference, which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming (GFM) inverter-based resources (IBR) act as a voltage source behind an impedance and provide a voltage-source characteristic, where the angle and magnitude of the voltage are controlled to achieve the regulation functions needed by the grid. The term IBR connotes an inverter that converts direct current (dc) to alternating current (ac) and which may be used to interface any energy source to an ac power system. Energy sources can possibly include, but are not limited to, a renewable source such as solar photovoltaic array, wind turbine, battery energy storage, ultracapacitor or fossil-fuel based source such as a diesel or natural gas genset, STATCOM, HVDC VSC, or any combination of these energy sources tied to a dc network. Moreover, the term "grid-forming IBR" is generally defined as an IBR that employs a local controller to "stiffly" regulate both (1) the local ac voltage magnitude and (2) local ac frequency (or phase angle) in the fast time-scale. In other words, the response time of the local controller voltage regulation and frequency (or phase) regulation loop is assumed to be well below 100 milliseconds (ms). The disturbance rejection and/or feedback control performance of the voltage and frequency (or phase) regulation loops are sufficiently high-bandwidth (or "stiff") that the voltage and frequency changes only moderately in the face of unexpected grid events throughout a sliding time window of approximately 100 ms.

In addition, the impedance of the GFM IBR is normally dictated by the hardware of the system, such as reactors, transformers, or rotating machine impedances. With this structure, current will flow according to the demands of the grid, while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

In particular, a simple circuit of a full-conversion grid-forming inverter-based resource connected to a grid is shown in FIG. 2, where the voltage $E_1$ and angle $\delta_1$ reflect quantities synthesized by the grid-forming resource and $X_{term}$ is the reactance of the grid-forming resource. The steady-state power flow in the system is characterized by the following relationship:

$$P_T = (E_1 V_{thev}/(X_{term}+X_{thev}))*\sin(\delta_1-\theta\text{th}) \cong (E_1 V_{thev}/(X_{term}+X_{thev}))*(\delta_1-\theta\text{th}) \quad \text{Equation (1)}$$

The power generated by the grid-forming resource depends on the external grid voltage ($V_{thev}$) and grid impedance ($X_{thev}$), which are generally unknown and changing. Therefore, for conventional systems, control of the grid-forming resource is practically realized by controlling the voltage source with respect to a locally measured voltage and angle ($V_T$ and $\theta_T$). The active power equation can therefore be written as follows:

$$P_T = (E_1 V_T/X_{term})*\sin(\delta_{1T}) \cong (E_1 V_T/X_{term})*\delta_{1T} \quad \text{Equation (2)}$$

where $\delta_{1T}$ reflects the difference between the grid-forming resource physical voltage angle and the locally measured angle. As such, the active power dynamics of the system are related to the impedance of the system as follows:

$$dP_T/d\delta_{1T} \alpha 1/X_{term} \quad \text{Equation (3)}$$

Referring now to FIG. 3, a schematic diagram for controlling active power and voltage for an inverter-based resource is illustrated. As shown, output $E_1$ reflects the desired converter voltage magnitude and output $\delta_{1T}$ reflects the desired converter voltage angle with respect to a locally measured angle ($\delta_T$). Accordingly, the active power output and voltage are controlled through manipulation of the converter voltage so that the resulting voltage drop across the internal reactance ($X_{term}$) achieves the desired control objectives. This voltage drop is given by the following equation:

$$V_T = E_1 - j*X_{term}*I_T \quad \text{Equation (4)}$$

The $X_{term}$, however, is typically dictated by the hardware of the power circuit and may include reactors and/or transformer impedance. Furthermore, with grid-forming control, current changes rapidly when there are grid disturbances. Therefore, for conventional systems, the control action is typically gradual to restore the steady-state operating conditions commanded by higher-level controls. The amount of current change is inversely related to the total impedance of the circuit. As such, if the current exceeds limits, the control responds rapidly to force the current to be within limits. However, this drastic nonlinearity can cause chaotic behavior when applied to a grid consisting of many other similar systems. Alternatively, if the current change is too small, then the grid-forming system will not contribute as much as it could to support the grid.

Thus, transient power-limiting during a disturbance is a challenging task for GFM IBRs. Thus, referring now to FIG. 4, an example power limit mode is illustrated. As shown, the power limit mode provides a transient power-limiting control solution for grid-forming inverters by activating a usually-dormant PI regulator if an active power threshold $P_{ac}$ is surpassed during a limiting transient to drive the power back to a $P_{max}$ setting using the frequency reference. While this method has performed well within a microgrid setting, it is not always clear how much active power reserve (i.e., the difference between the $P_{MAX}$ setting and the PV's maximum power point (MPP)) is needed. Some amount of power reserve is needed due to inter-inverter dynamics during the transient. A conservatively low value for $P_{max}$, well below the MPP of a PV array, results in improved likelihood of a stable transient, but also requires significant PV curtailment in anticipation of the load step change.

There is also a potential for a cascading instability to occur due to system interactions, wherein an inverter exhausts its prime mover and trips despite activation of the power limit mode, and the tripping event subsequently overloads neighboring source(s). The power limit mode is also less effective at current limiting during faults.

Accordingly, an alternative to the aforementioned power limit mode is rapid application of a transient virtual impedance, which is a promising approach by which to provide critical current-limiting capability for grid-forming inverter-based resources during severe grid events. In comparison with other current-limiting methods (such as mode-switching to a grid-following control mode), virtual-impedance-based approaches can provide more reliable and predictable performance for a wide range of possible grid events. In particular, once activated, this method temporarily drops the inverter output voltage proportional to the output current. However, it is often unclear when to activate the transient virtual impedance, and how much virtual impedance to apply. For example, too little virtual impedance risks depletion of the dc bus voltage, and too much virtual impedance can result in deleterious loss of synchronism between GFM IBRs and reduced power quality. It is also unclear how much reserve is needed for power limiting.

In an example, a photovoltaic (PV)-fed, GFM local inverter network has the capacity to island from the main grid to boost the overall system resilience. The GFM IBRs within the network are fed mostly or exclusively from PV sources, and are likely to be outputting power close to their respective Maximum Power Points (MPPs). One or more GFM IBRs may be operating with a considerable amount of reserve (e.g., one or more battery-fed or highly-curtailed PV-fed GFM Further, the network may be importing from the main grid an amount of power less than or equal to the system-wide GFM reserve. Even still, during an islanding event, many of the PV-fed inverters may be in danger of exceeding their power limit during the transient due to the self-sacrificing nature of GFM operation.

Thus, the present disclosure is directed to a system and method that addresses the aforementioned issues. In particular, the present disclosure is directed to systems and methods for controlling a network of inverter-based resources connected to a power grid during a large disturbance, such as a load step or islanding event, that applies a distributed transient virtual impedance algorithm in the control scheme of the network to allow the network to autonomously ride through the disturbance and stably allocate the available system-wide reserves to the new active power load.

BRIEF DESCRIPTION

Aspects and advantages of the invention will be set forth in part in the following description, or may be obvious from the description, or may be learned through practice of the invention.

In one aspect, the present disclosure is directed to a method for controlling a network of inverter-based resources connected to a power grid during a disturbance. The network defines a first power load. In response to a start of or in anticipation of the disturbance, the method includes employing a distributed transient virtual impedance algorithm among the network of inverter-based resources. The distributed transient virtual impedance algorithm includes determining, via at least one of one or more power flow equations, one or more energy function equations, and one or more estimated power capabilities, a virtual impedance parameter and a modified power reference for one or more of the inverter-based resources. Further, the method includes activating the virtual impedance control parameter and the modified power reference for one or more of the inverter-based resources to ride through the disturbance in a manner that also optimizes use of the one or more estimated power capabilities for one or more of the inverter-based resources and that preserves synchronism between at least one of at least two of the inverter-based resources and between at least one of the inverter-based resources and the power grid. Thus, the virtual impedance control parameter temporarily reduces voltage proportionally with output current for one or more of the inverter-based resources, thereby resulting in a reduction of local power output of one or more of the inverter-based resources. It should be understood that the method may further include any of the additional features and/or steps described herein.

In another aspect, the present disclosure is directed to a system for controlling a network of inverter-based resources connected to a power grid during a disturbance. The network defines a first power load. The system includes a control system having at least one processor. The processor(s) is configured to perform a plurality of operations, including but not limited to, in response to a start of or in anticipation of the disturbance, employing a distributed transient virtual impedance algorithm among the network of inverter-based resources. The distributed transient virtual impedance algorithm includes, for example, determining, via at least one of one or more power flow equations, one or more energy function equations, and one or more estimated power capabilities, a virtual impedance control parameter and a modified power reference for one or more of the inverter-based resources. Further, the distributed transient virtual impedance algorithm includes activating the virtual impedance control parameter and the modified power reference for one or more of the inverter-based resources to ride through the disturbance in a manner that also optimizes use of the one or more estimated power capabilities for one or more of the inverter-based resources and that preserves synchronism between at least one of at least two of the inverter-based resources and between at least one of the inverter-based resources and the power grid, wherein the virtual impedance control parameter temporarily reduces voltage proportionally with output current for one or more of the inverter-based resources, thereby resulting in a reduction of local power output of one or more of the inverter-based resources. It should be understood that the system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
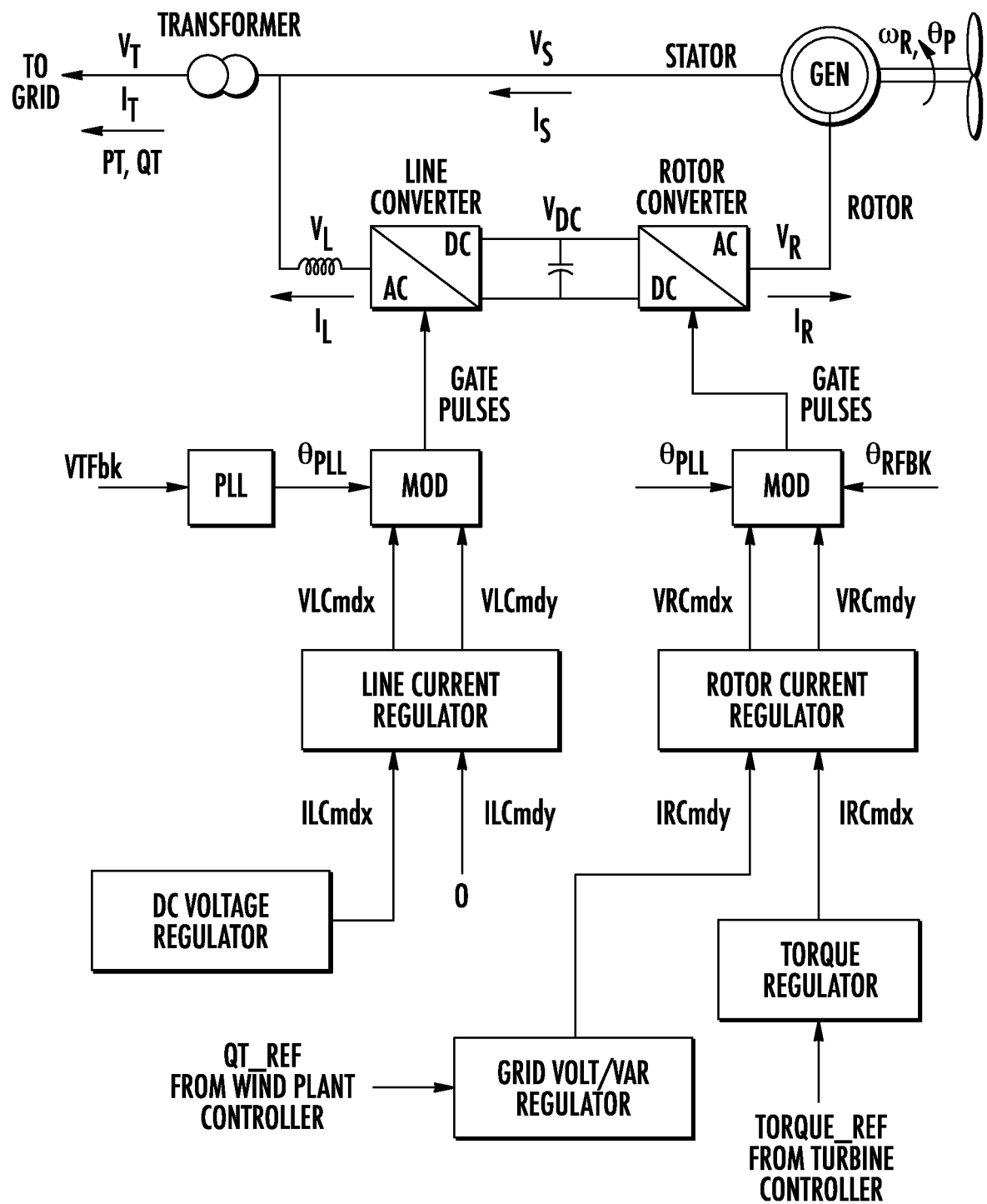
FIG. 1 illustrates a one-line diagram of a double-fed wind turbine generator with structure of converter controls for grid-following application according to conventional construction.
Figure 2:
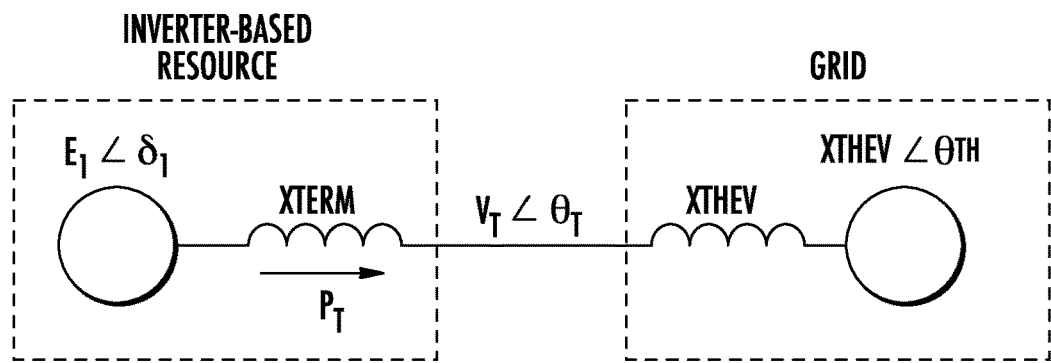
FIG. 2 illustrates a circuit diagram of one embodiment of a grid-connected grid-forming inverter-based resource according to conventional construction.
Figure 3:
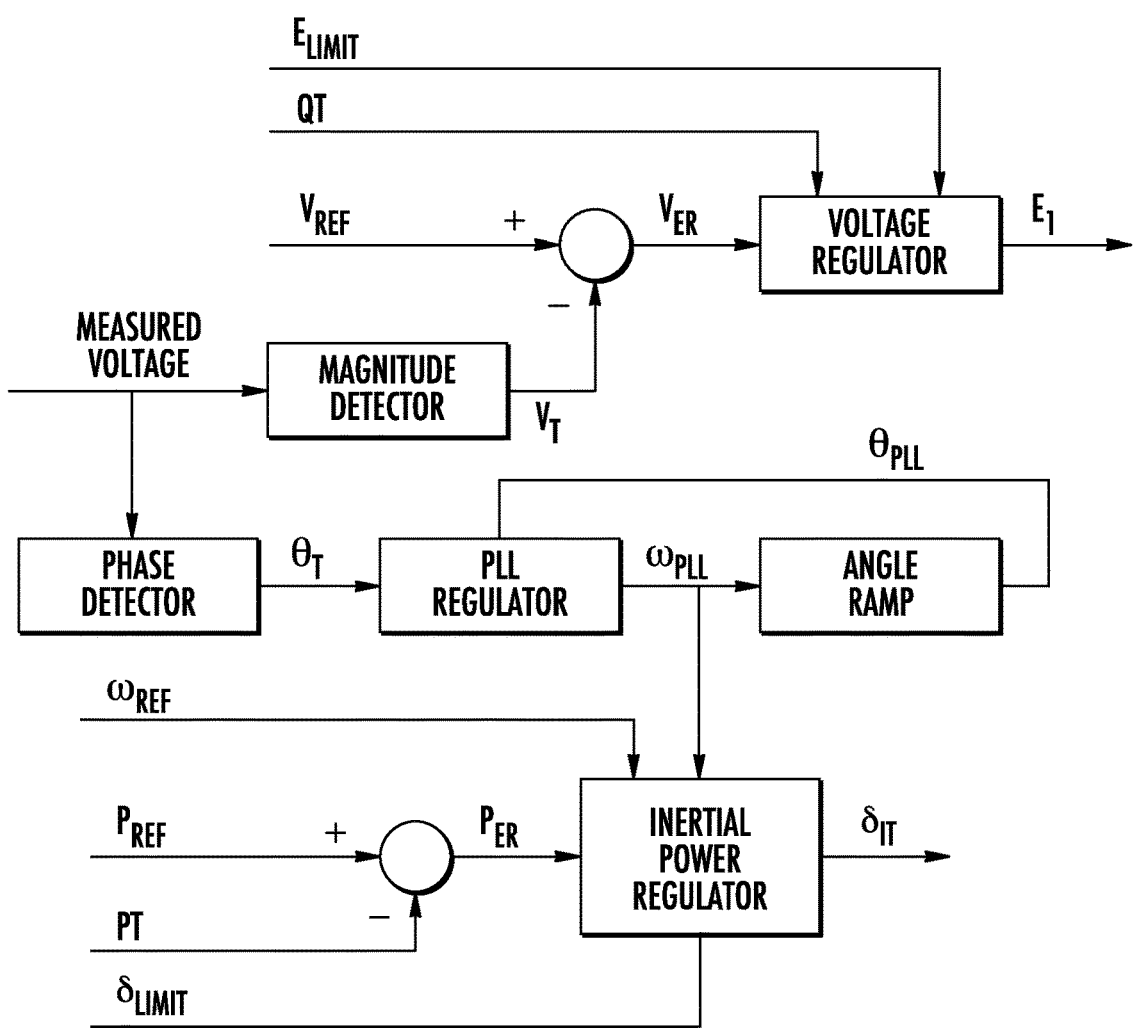
FIG. 3 illustrates a schematic diagram of one embodiment of power and voltage control of a grid-connected grid-forming inverter-based resource according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to controlling a network of inverter-based resources connected to a power grid during a large disturbance. In particular, the present disclosure is directed to a distributed transient virtual impedance (DTVI) algorithm for a network of two or more grid-forming (GFM) inverter-based resources (IBRs). Thus, the present disclosure allows for a stable transient response of multiple GFM IBRs to a large disturbance such as a large load step or islanding event. More specifically, the DTVI algorithm employs an online or near-real-time control algorithm and sparse, low-bandwidth communication between the GFM IBRs or between the IBRs and a centralized controller to determine an optimal (a) transient virtual reactance control parameter and (b) power reserve control parameter for each GFM IBR. As used herein, the power reserve is further explained and described in U.S. Pat. No. 10,749,446, which is incorporated herein by reference in its entirety. Under this control paradigm, during a large disturbance in the power system, such as a load step or islanding event, each GFM IBR is configured to ride through the event by activating its specified virtual reactance. In such embodiments, the virtual reactance is configured to temporarily reduce voltage proportionally with output current, resulting in a rapid reduction of local power output. Coupled with application of the power reserve control parameter, the specified distribution of transient reactance ensures that maximum active power flow from each IBR is not surpassed, and that synchronism between each IBR and its neighbors is maintained.

Thus, the present disclosure is configured to address challenges associated with photovoltaic (PV) GFM IBR networks, but can be also applied to any GFM IBR network including those that contain energy-storage-based resources. Moreover, the present disclosure can be applied to networks that contain a combination of GFM IBRs, grid-following IBRs, and/or conventional synchronous-machine-based resources.

Figure 5:
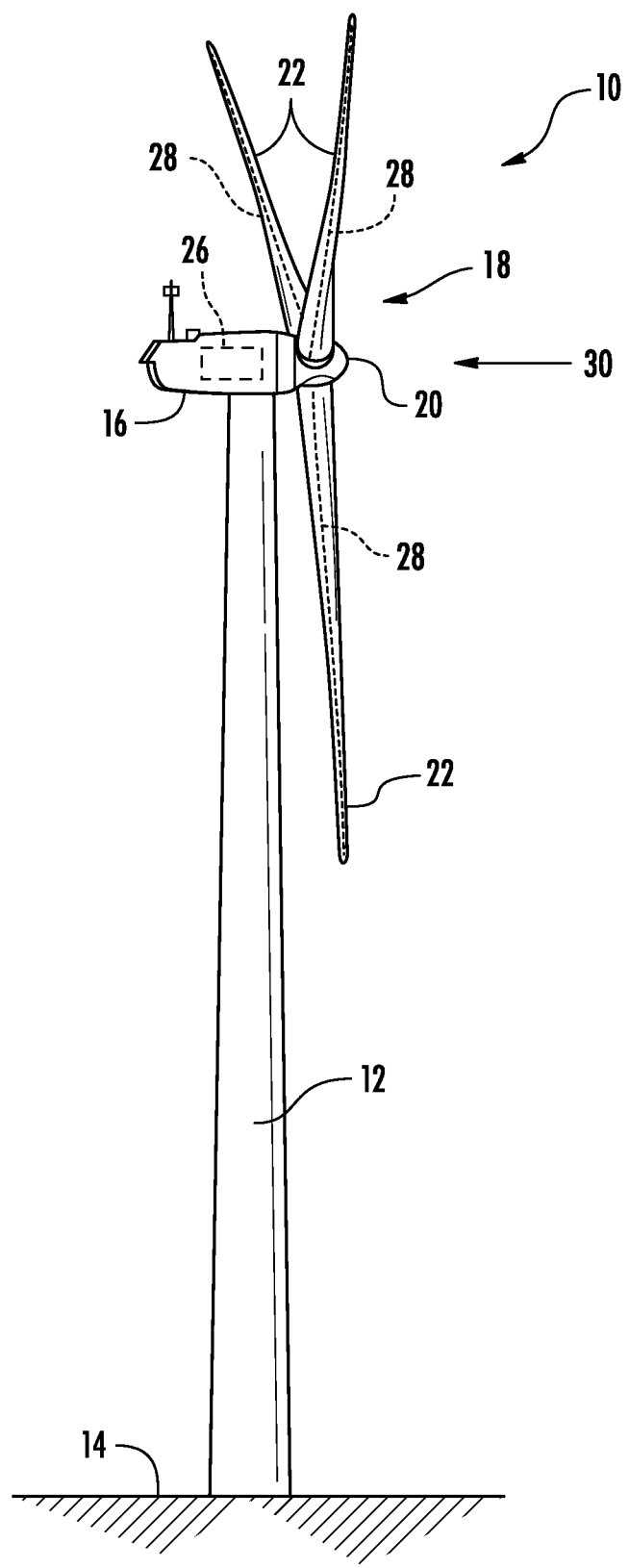
FIG. 5 illustrates a perspective view of one embodiment of a wind turbine according to the present disclosure.

Referring now to the drawings, FIG. 5 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 6) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 4:
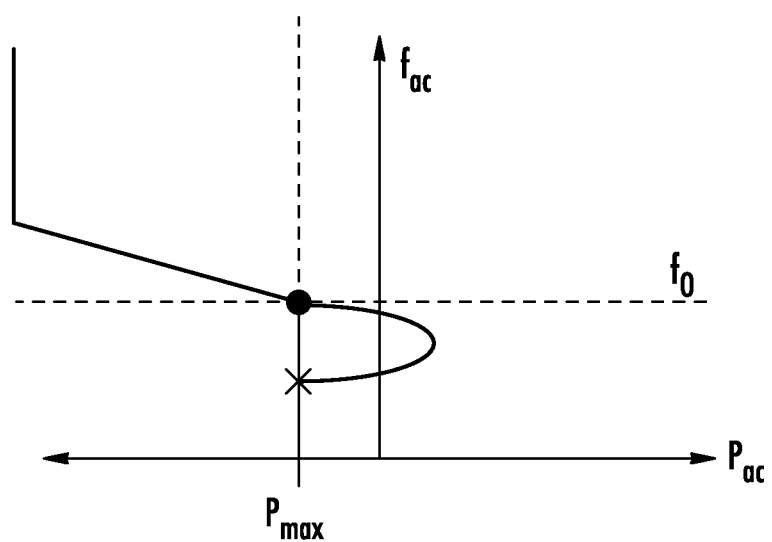
FIG. 4 illustrates a schematic diagram of an embodiment of a power limit mode droop diagram with a parametric transient plot that shows how extra power margin is required according to conventional construction.
Figure 6:
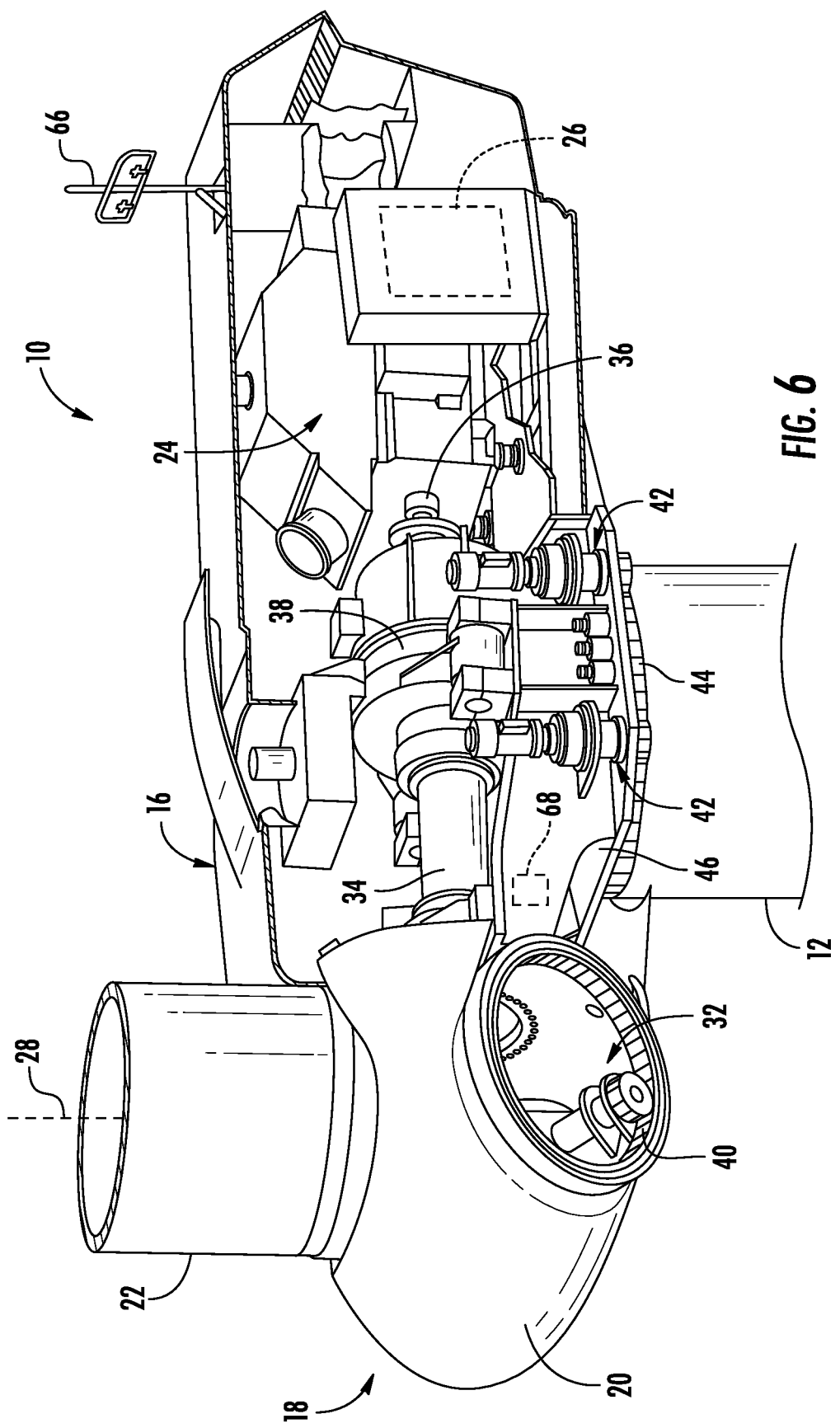
FIG. 6 illustrates a simplified, internal view of one embodiment of a nacelle according to the present disclosure.

Referring now to FIG. 6, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 30, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 7:
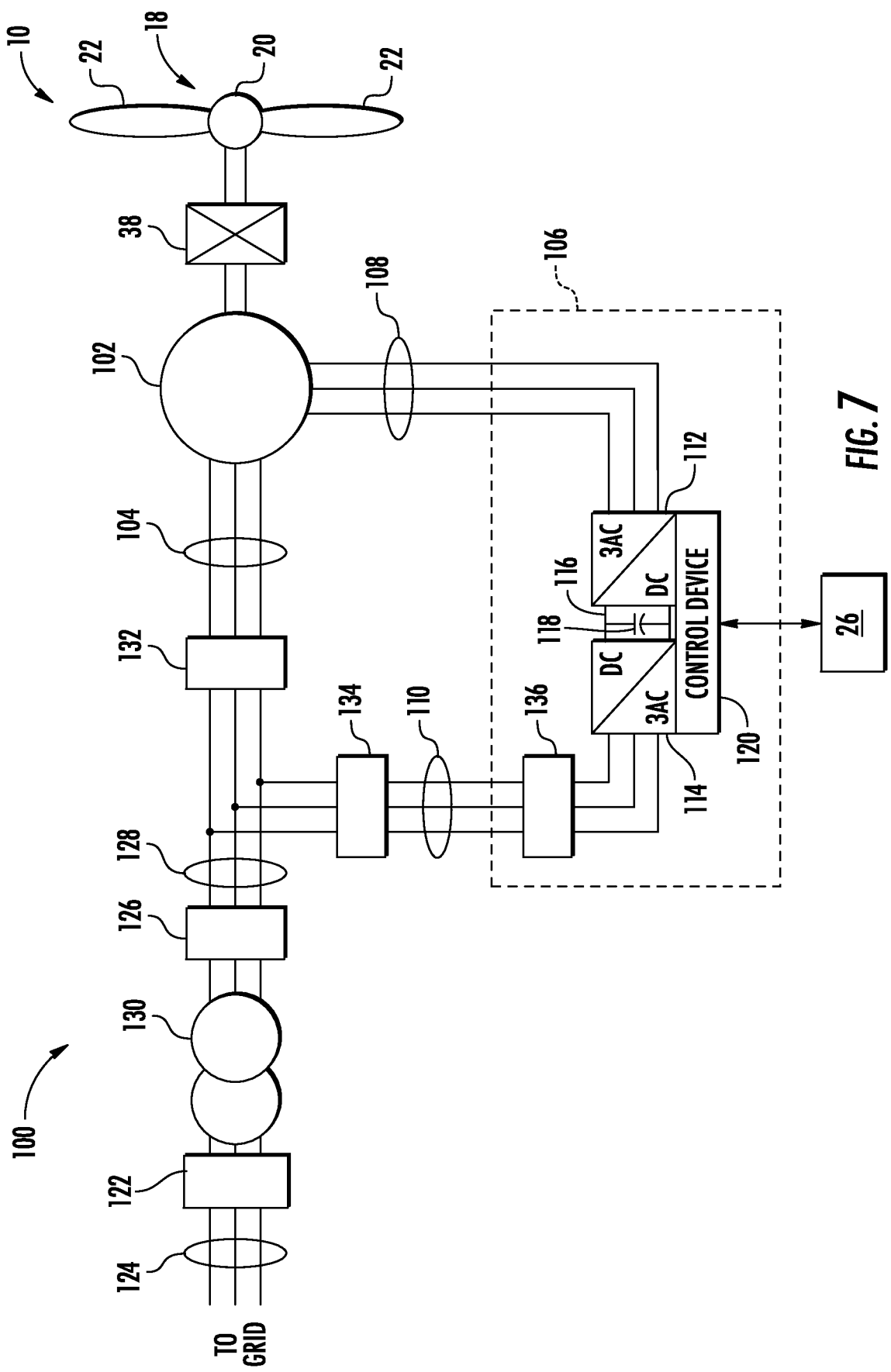
FIG. 7 illustrates a schematic view of one embodiment of a wind turbine electrical power system suitable for use with the wind turbine shown in FIG. 4.

Referring now to FIG. 7, a schematic diagram of one embodiment of a wind turbine power system 100 is illustrated in accordance with aspects of the present disclosure. Although the present disclosure will generally be described herein with reference to the system 100 shown in FIG. 7, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 7 and as mentioned, the rotor 18 of the wind turbine 10 (FIG. 5) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor side converter 112 converts the AC power provided from the rotor bus 108 into direct current (DC) power and provides the DC power to the DC link 116. As is generally understood, switching elements (e.g., IGBTs) used in the bridge circuits of the rotor side converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g., IGBTs) used in bridge circuits of the line side converter 114 can be modulated to convert the DC power on the DC link 116 into AC power on the line side bus 110. The AC power from the power converter 106 can be combined with the power from the stator of DFIG 102 to provide multiphase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 8:
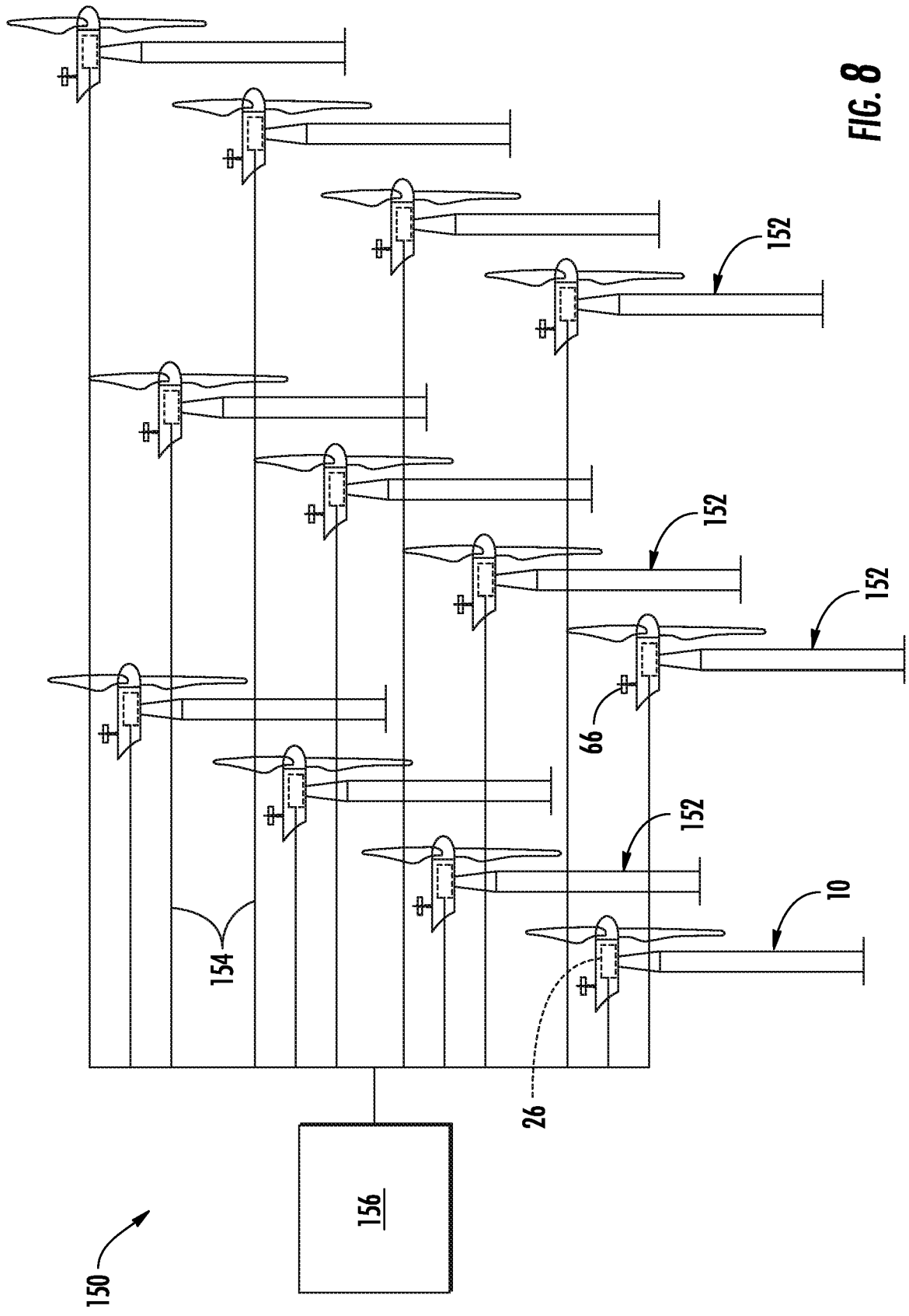
FIG. 8 illustrates a schematic view of one embodiment of a wind farm having a plurality of wind turbines according to the present disclosure.

Referring now to FIG. 8, the wind turbine power system 100 described herein may be part of a wind farm 150. As shown, the wind farm 150 may include a plurality of wind turbines 152, including the wind turbine 10 described above, and an overall farm-level controller 156. For example, as shown in the illustrated embodiment, the wind farm 150 includes twelve wind turbines, including wind turbine 10. However, in other embodiments, the wind farm 150 may include any other number of wind turbines, such as less than twelve wind turbines or greater than twelve wind turbines. In one embodiment, the turbine controllers of the plurality of wind turbines 152 are communicatively coupled to the farm-level controller 156, e.g., through a wired connection, such as by connecting the turbine controller 26 through suitable communicative links 154 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Figure 9:
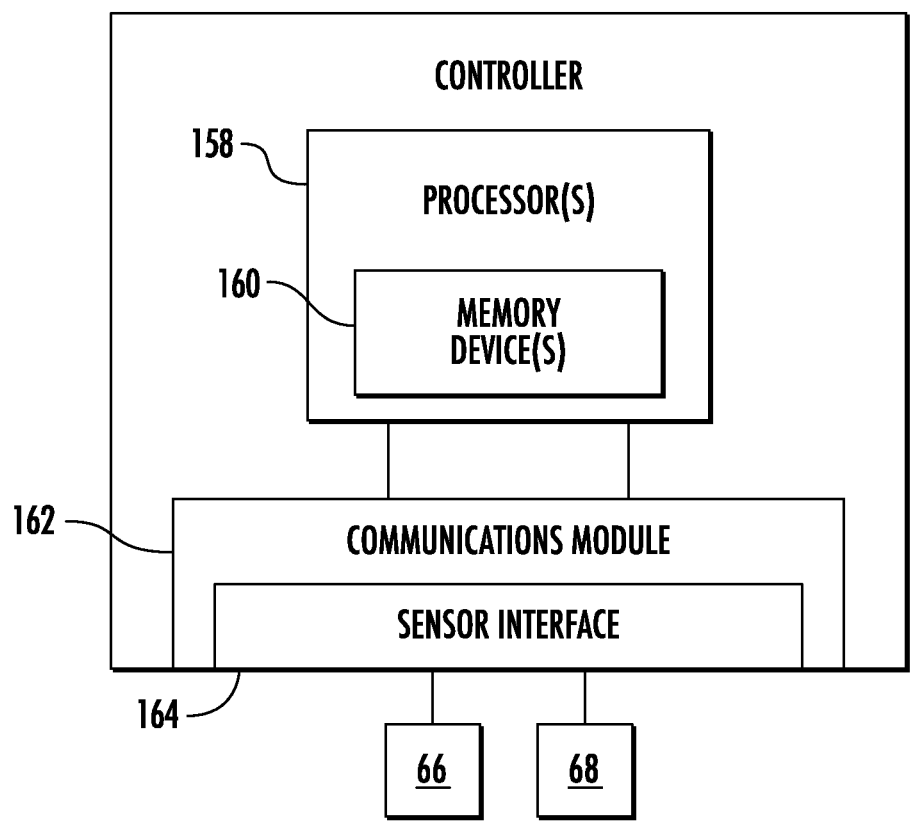
FIG. 9 illustrates a block diagram of one embodiment of a controller according to the present disclosure.

Referring now to FIG. 9, a block diagram of one embodiment of suitable components that may be included within the controller (such as any one of the turbine controller 26, the converter controller 120, and/or the farm-level controller 156 described herein) in accordance with example aspects of the present disclosure is illustrated. As shown, the controller may include one or more processor(s) 158, computer, or other suitable processing unit and associated memory device (s) 160 that may include suitable computer-readable instructions that, when implemented, configure the controller to perform various different functions, such as receiving, transmitting and/or executing wind turbine control signals (e.g., performing the methods, steps, calculations, and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine 10. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 66, 68 to be converted into signals that can be understood and processed by the processor(s) 58.

Figure 10:
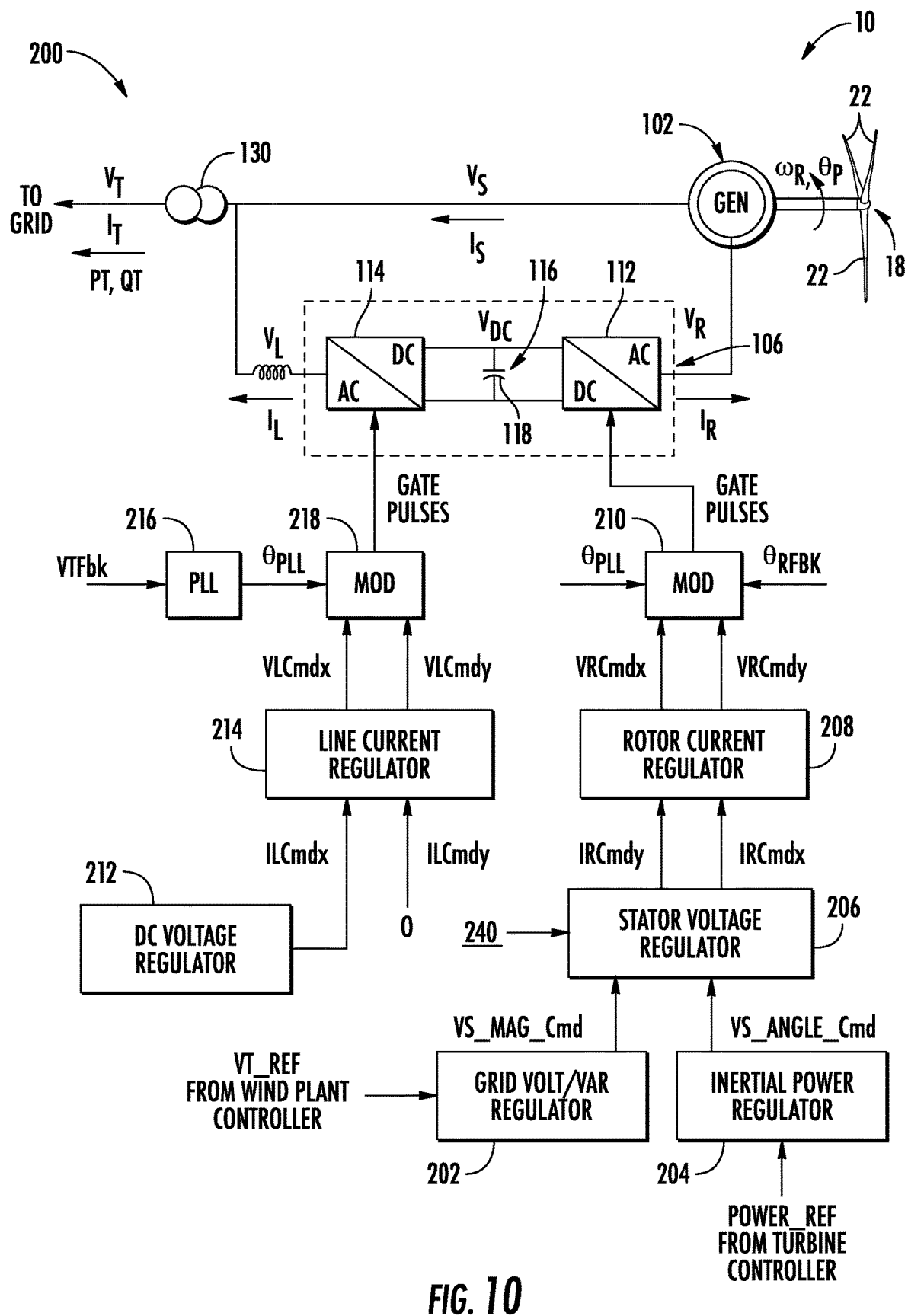
FIG. 10 illustrates a one-line diagram of a double-fed wind turbine generator with converter controls for grid-forming application according to the present disclosure.

Referring now to FIG. 10, a schematic diagram of one embodiment of a system 200 for providing grid-forming control of a double-fed generator of a wind turbine according to the present disclosure is illustrated. More specifically, as shown, the system 200 may include many of the same features of FIG. 7 described herein, with components having the same reference characters representing like components. Further, as shown, the system 200 may include a control structure for controlling the line-side converter that is similar to the control structure shown in FIG. 7.

Moreover, as shown, the line-side converter control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g., a phase-locked loop angle) from a phase-locked loop 216 to generate one or more gate pulses for the line-side converter 114. The phase-locked loop 216 typically generates its output using a voltage feedback signal.

Furthermore, as shown, the system 200 may also include a control structure for controlling the rotor-side converter 112 using grid-forming characteristics. In particular, as shown in FIG. 10, the system 200 may include a stator voltage regulator 206 for providing such grid-forming characteristics. In addition, as shown, the system 200 may include a grid voltage/VAR regulator 202, an inertial power regulator 204, a rotor current regulator 208, and a modulator 210.

In an embodiment, the grid volt/VAR regulator 202 receives a voltage reference (e.g., VT_REF) from the farm-level controller 156 and generates a stator voltage magnitude command (e.g., VS_Mag_Cmd), whereas the inertial power regulator receives a power reference from the turbine controller 26 and generates a stator voltage angle command (e.g., VS_Angle_Cmd). More specifically, in an embodiment, as shown, the stator voltage regulator 206 determines one or more rotor current commands (e.g., IRCmdy and IRCmdx) as a function of the stator voltage magnitude command, the stator voltage angle command, and/or a stator current feedback signal 240 of the generator 112. It should be understood that the stator feedback current 240 is a strong indicator of the characteristics of the externally connected power system, i.e., the grid. Therefore, the stator feedback current 240 can be used as a feedback signal to decouple the response of stator voltage to variations to the nature of the grid. Further details relating to the stator voltage regulator 206 are further explained and described in PCT/US2020/013787 entitled "System and Method for Providing Grid-Forming Control for a Doubly-Feb Wind Turbine Generator," which is incorporated herein by reference in its entirety.

Figure 11A:
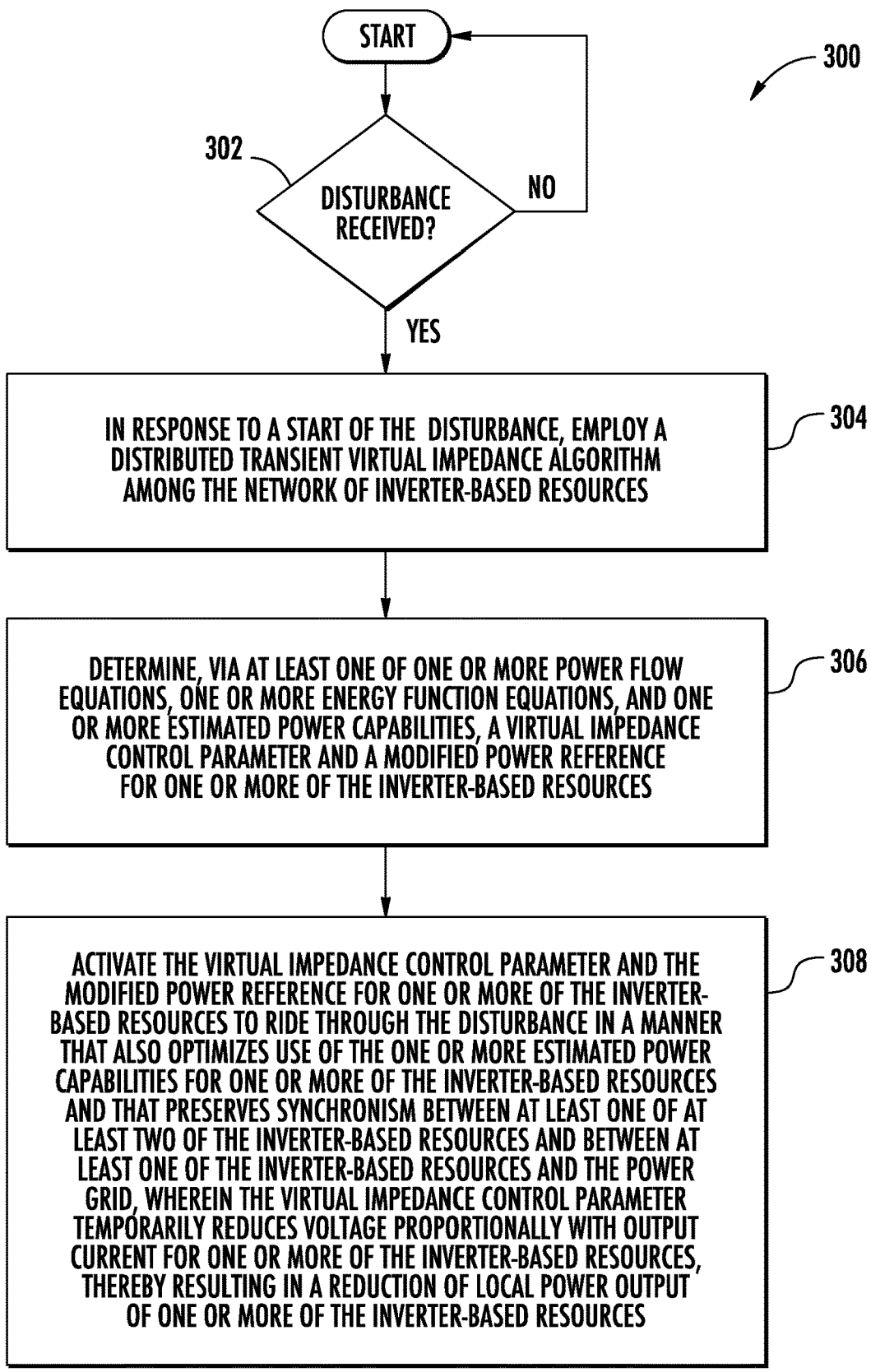
FIGS. 11A and 11B illustrate flow diagrams of different embodiments of a method for controlling a network of inverter-based resources connected to a power grid during a disturbance according to the present disclosure.
Figure 11B:
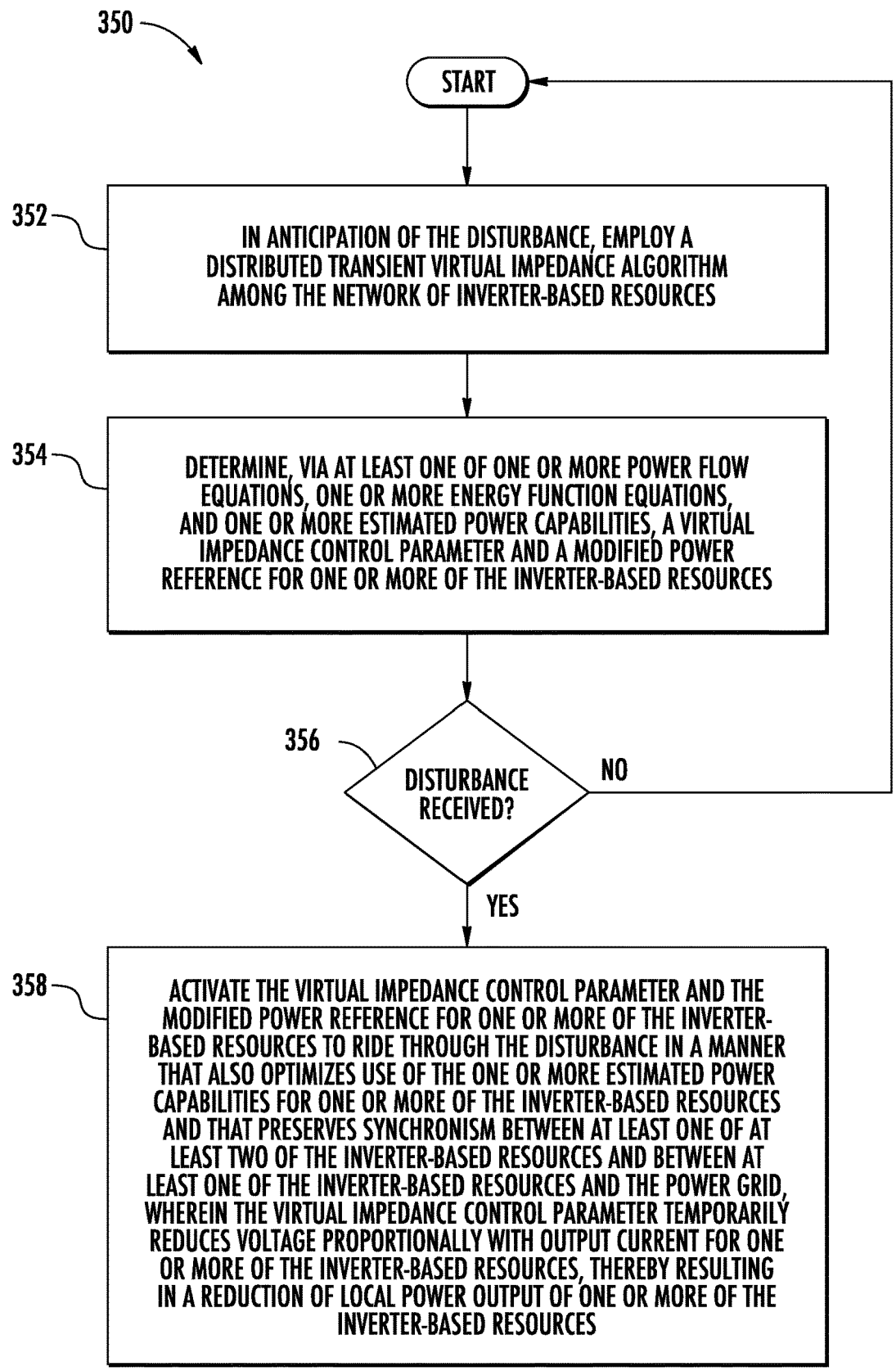
Figure 12:
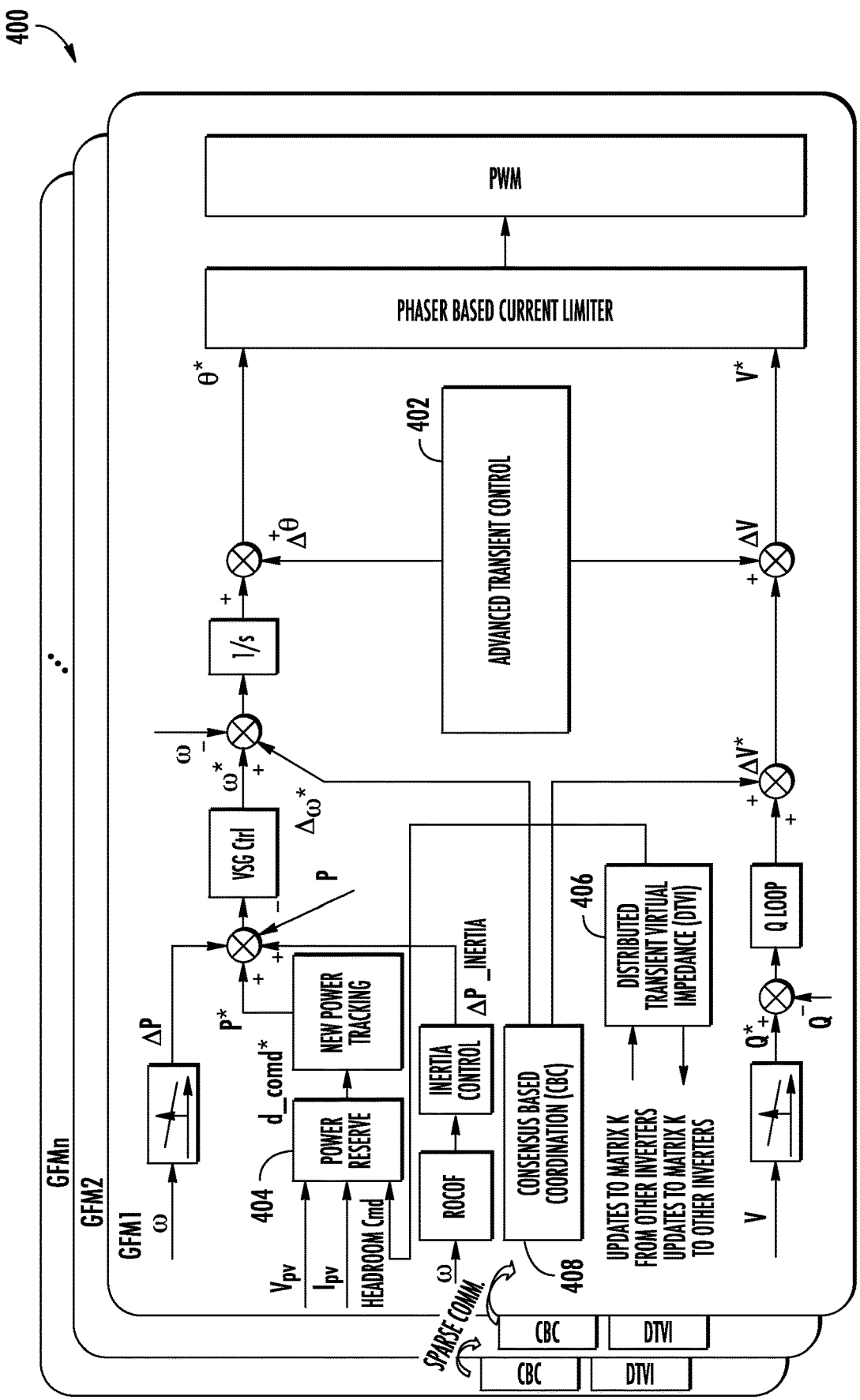
FIG. 12 illustrates a schematic diagram of an embodiment of a system for controlling a network of inverter-based resources connected to a power grid during a disturbance that provides advanced transient control according to the present disclosure.

Referring now to FIGS. 11A, 11B, and 12, the present disclosure is directed to methods 300, 350 and systems 400 for controlling a network of inverter-based resources that may be connected to a power grid during a large disturbance, such as a load step or islanding event. As used herein, a large disturbance may generally refer, but is not limited to, severe instances of the following: (1) symmetric or asymmetric line-to-ground or line-to-line fault when islanded or grid-tied, with the fault being local to the inverter or electrically distant, (2) a step-up or step-down or sag or swell in the utility grid voltage magnitude, when grid-tied, (3) a step-up or step-down in the utility grid phase angle, when grid-tied, (4) loss of a distribution or transmission line when islanded or grid-tied, (5) unexpected loss of another significant grid-forming source when islanded or grid-tied, (6) large steps in constant-power load, constant current load, constant impedance load, or machine load, or large steps in a composite that includes any of these aforementioned load types, when islanded or grid-tied, and/or (7) large steps in load associated with an unintentional islanding event, i.e. an unintentional transition from grid-tied to islanded condition or an unintentional synchronization event, i.e. an unintentional transition from islanded to grid-tied condition, as well as any other severe grid events now or later known in the art.

Accordingly, the methods 300, 350 and system 400 apply a distributed transient virtual impedance algorithm in the control scheme of the network to allow the network to autonomously ride through the disturbance and stably allocate the available system-wide reserves to the new active power load. As used herein, a disturbance may generally refer, but is not limited to, load steps and/or islanding events, as well as any other disturbance now or later known in the art. Further, a disturbance can also manifest as a combination of two or more of disturbance types, including combinations of disturbances that happen simultaneously or combinations that occur in a consecutive manner within a short time period.

Referring particularly to FIGS. 11A and 11B, flow diagrams of various embodiments of such methods 300, 350 for controlling a network of inverter-based resources connected to a power grid during a large disturbance according to the present disclosure is illustrated. It should be appreciated that the disclosed methods 300, 350 may be implemented with any suitable inverter-based resource having any suitable configuration. In several embodiments, for example, the inverter-based resource may be a wind turbine power system (e.g., having a full conversion power system or a dual-fed power conversion system as illustrated in FIG. 10, or dual-fed systems that regulate voltage at some other location instead of the stator, or that dual-fed systems that regulate magnetic flux or dual-fed systems that regulate the grid or stator voltage using the line-side inverter instead of the rotor-side inverter), a solar inverter, an energy storage system, a STATCOM, a hydro-power system, or any other inverter-based system mentioned herein or known in the art. In addition, although FIGS. 11A and 11B depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring first to FIG. 11A, as shown at (302), the method 300 includes receiving an indication of a start of a disturbance. In response to the start of the disturbance, as shown at (304), the method 300 includes employing a distributed transient virtual impedance algorithm among the network of inverter-based resources. In particular, as shown at (306), the distributed transient virtual impedance algorithm includes determining, via at least one of one or more power flow equations, one or more energy function equations, and one or more estimated power capabilities, a virtual impedance control parameter and a modified power reference for one or more of the inverter-based resources. In additional embodiments, the distributed transient virtual impedance algorithm may also utilize any non-negligible actual impedances known to exist in the network (such as one or more inverter line impedance(s), induction generator impedance, synchronous generator impedance, one or more transformer leakage impedance(s), and/or a significant Thevenin impedance(s) associated with a grid-tie) to determine the virtual reactance control parameter and the available power capability for one or more of the inverter-based resources.

Further, as shown at (308), the method 300 includes activating the virtual impedance control parameter and the modified power reference for one or more of the inverter-based resources to ride through the disturbance in a manner that also optimizes use of the one or more estimated power capabilities for one or more of the inverter-based resources and that preserves synchronism between at least one of at least two of the inverter-based resources and between at least one of the inverter-based resources and the power grid. In an embodiment, for example, the synchronism between at least two of the inverter-based resources may include at least two grid-forming sources in the power grid. In such embodiments, a grid-forming source may include, for example, a grid-forming inverter, a synchronous machine, and/or an infinite bus. Thus, the virtual reactance control parameter temporarily reduces voltage proportionally with output current for one or more of the inverter-based resources, thereby resulting in a reduction of local power output (e.g., active power and/or reactive power) of one or more or each of the inverter-based resources.

Referring now to FIG. 11B, in another embodiment, as shown at (352), in anticipation of a disturbance, the method 350 includes employing a distributed transient virtual impedance algorithm among the network of inverter-based resources. Further, as shown at (354), the distributed transient virtual impedance algorithm includes determining, via at least one of one or more power flow equations, one or more energy function equations, and one or more estimated power capabilities, a virtual impedance control parameter and a modified power reference for one or more of the inverter-based resources. As shown at (356), the method 350 includes determining whether the disturbance has been received. If so, as shown at (358), the method 350 further includes activating the virtual impedance control parameter and the modified power reference for one or more of the inverter-based resources to ride through the disturbance in a manner that also optimizes use of the one or more estimated power capabilities for one or more of the inverter-based resources and that preserves synchronism between at least one of at least two of the inverter-based resources and between at least one of the inverter-based resources and the power grid. Thus, the virtual reactance control parameter temporarily reduces voltage proportionally with output current for each of the inverter-based resources, thereby resulting in a reduction of local power output (e.g., active power and/or reactive power) of one or more or each of the inverter-based resources.

The distributed transient virtual impedance (DTVI) algorithm of the present disclosure can be better understood with respect to FIGS. 12-17. In particular, as shown in FIG. 12, a schematic diagram of an embodiment of a system 400 for controlling a network of inverter-based resources connected to a power grid during a disturbance that provides advanced transient control according to the present disclosure is illustrated. For example, as shown, the GFM IBR control scheme may include advanced transient control 402 that provides dynamic current limiting, a power reserve 404 that determines an optimal operating point for the IBR(s) to improve multiple IBR transient performance, the DTVI algorithm 406 as described herein that guarantees transient stability by issuing virtual impedance and power reserve commands, and/or consensus-based coordination 408 that provides autonomous coordination among multiple GFM IBRs using sparse communications.

Accordingly, the DTVI algorithm 406 of the present disclosure provides predictable, stable redistribution of active power following a severe disturbance, provides reactive power limiting during a fault, and/or minimizes the need for curtailment in anticipation of a disturbance. Depending upon the availability of a sparse communication network between GFM IBRs, employing coordination between IBRs to optimize the application of the DTVI algorithm 406 can be used to maximize the use of power reserves and minimize potential for loss of synchronism.

Figure 13:
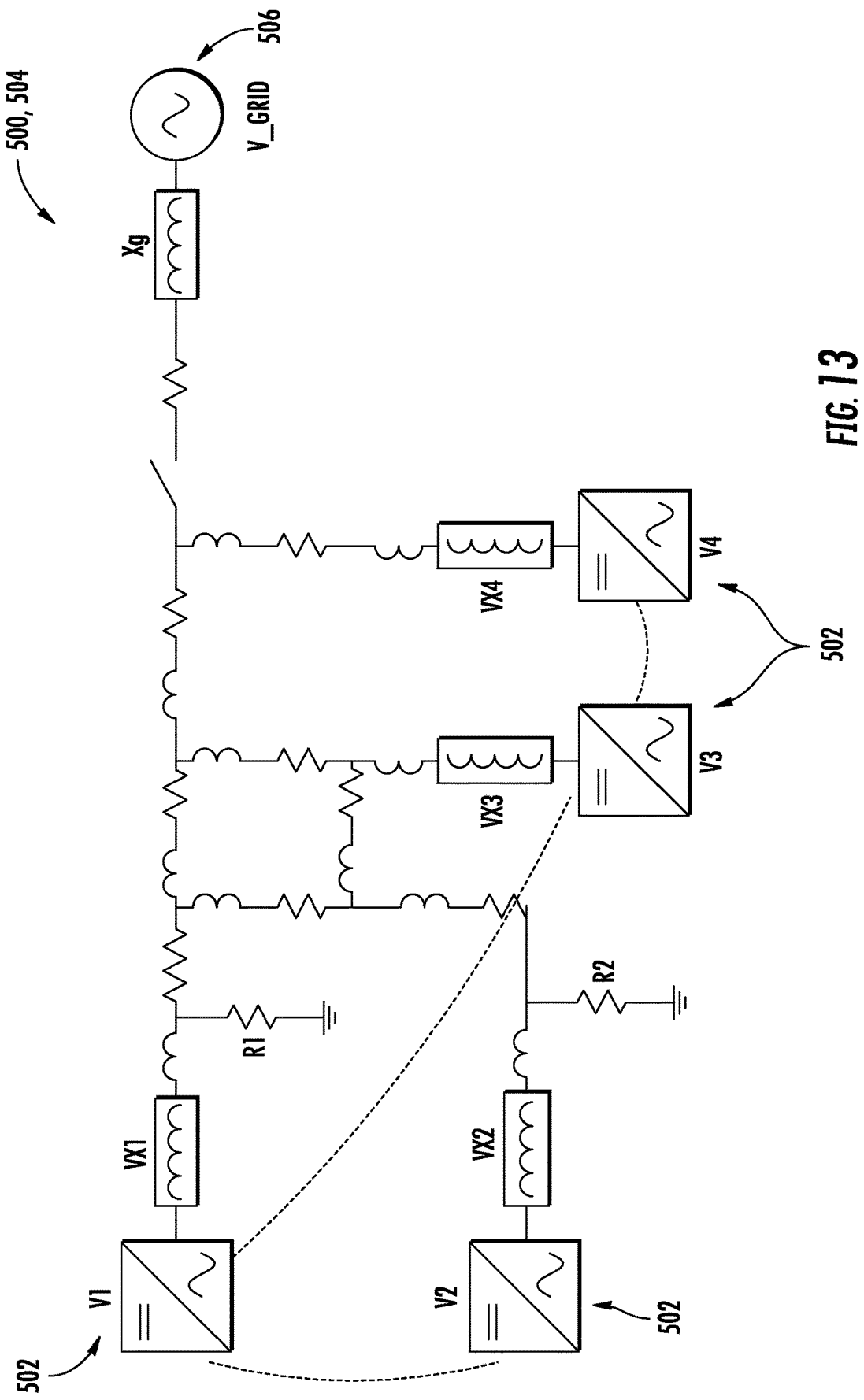
FIG. 13 illustrates a schematic diagram of an embodiment of a distribution network containing a plurality of GFM IBR-based resources according to the present disclosure.
Figure 14:
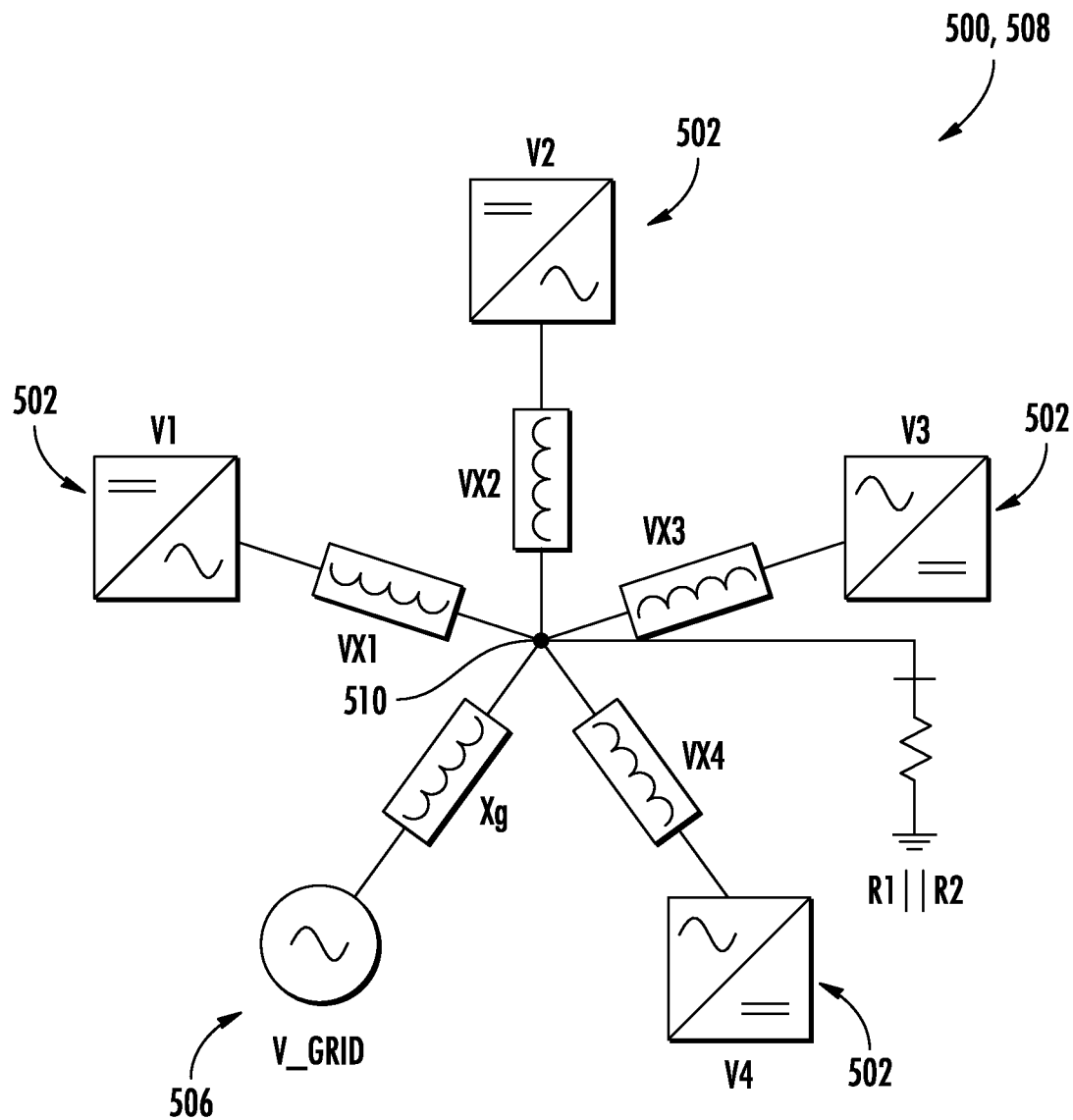
FIG. 14 illustrates a schematic diagram of an embodiment of a virtual star network of the plurality of GFM IBR-based resources of FIG. 13 during a large disturbance according to the present disclosure.
Figure 15:
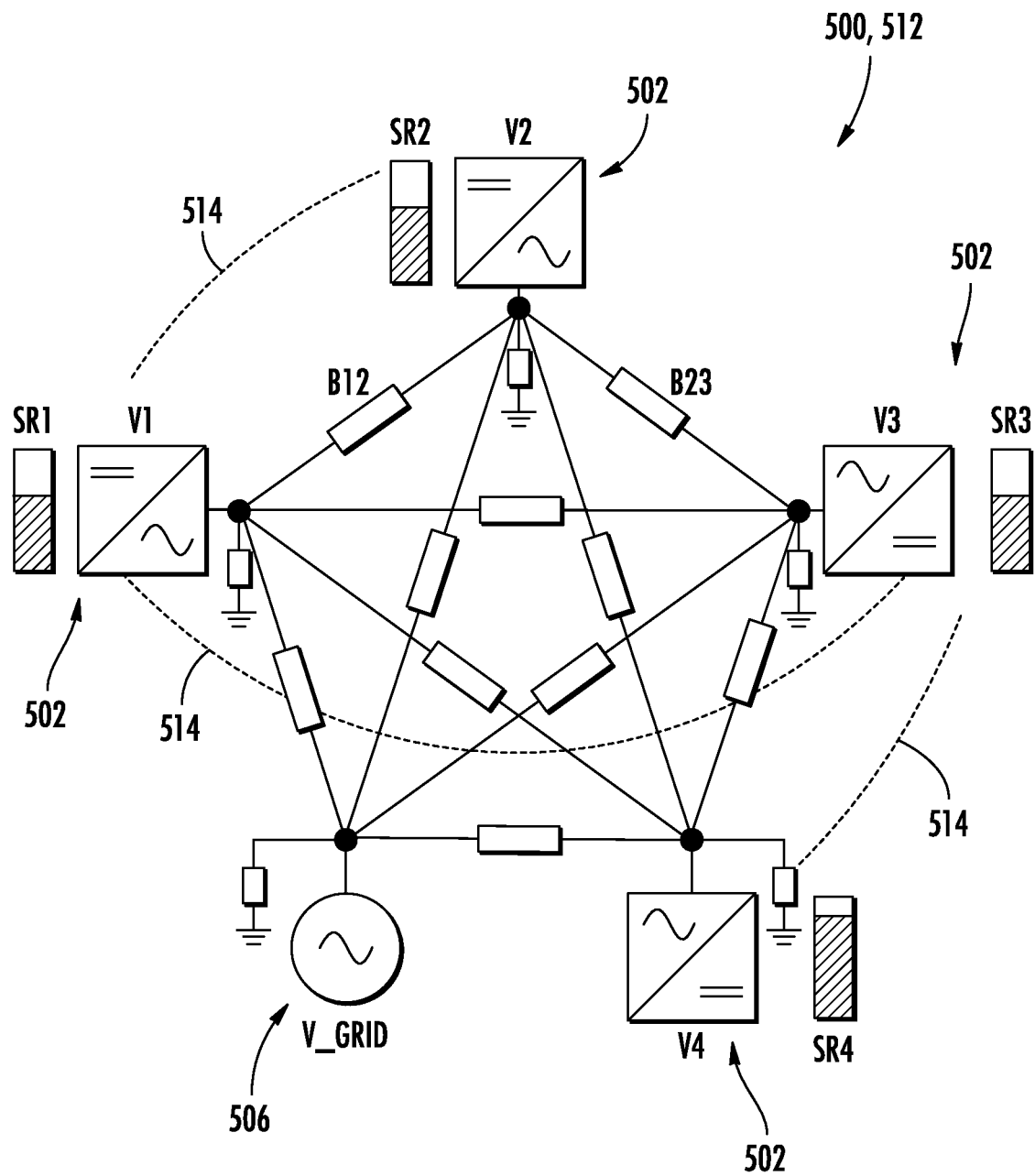
FIG. 15 illustrates a schematic diagram of an embodiment of a Kron-reduced virtual susceptance network of the plurality of GFM IBR-based resources of FIG. 14 during a large disturbance according to the present disclosure.

Referring now to FIGS. 13-15, various schematic diagrams of an embodiment of a distribution network 500 containing a plurality of GFM IBRs 502 according to the present disclosure are illustrated. In particular, FIG. 13 illustrates a PV-fed, grid-forming local inverter network 504 that has the capacity to island from the main grid 506 to boost the overall system resilience. The GFM IBRs 502 within the network 500 are fed mostly or exclusively from PV, and are likely to be outputting power close to their respective maximum power points (MPPs). One or more of the GFM IBRs 502 may be operating with a considerable amount of reserve (e.g., one or more battery-fed or highly-curtailed PV-fed GFM IBRs). Typically, the network 500 is importing from the main grid 506 an amount of power less than or equal to the system-wide GFM reserve. Despite this, during an islanding event, many of the PV-fed GFM IBRs 502 may be in danger of exceeding their power limit during the transient due to the self-sacrificing nature of GFM operation. Thus, the DTVI algorithm 406 of the present disclosure can be applied in this scenario to allow the GFM network 500 to autonomously ride through the disturbance and stably allocate the available system-wide reserves in the post-disturbance system. In particular, the virtual reactances employed by the GFM IBR controllers would greatly exceed the parasitic distribution line reactances and resistances, as well as transformer leakage inductances within the network, e.g., by a factor of 10× or 15× or more. When the active power threshold is surpassed, these virtual reactances dwarf the parasitic elements.

In particular, the virtual reactances may be applied to an output of one or more or each of the IBRs such that a combined magnitude of the effective grid-tie impedance of the network of inverter-based resources dwarf any comparatively small and unknown, actual impedances of the network. Thus, in such embodiments, an effective network topology temporarily emerges during and immediately after the disturbance and is composed partially or wholly of known virtual impedances and/or known actual impedances of the network. Furthermore, in an embodiment, the combined magnitude of the effective grid-tie impedance of the network would greatly exceed approximately 0.01 per-unit during, and also immediately after, the disturbance. Moreover, in an embodiment, the effective grid-tie impedance of the network may include the virtual impedance control parameter and any non-negligible actual impedances in series with the virtual impedance control parameter, such as an inverter line filter impedance, induction generator impedance, and/or transformer impedance.

It should generally be understood by those having ordinary skill in the art that not every parasitic impedance within the power grid may be known in terms of its magnitude and/or phase angle (or real and reactive component). However, most of the large/non-negligible impedances are well-known by whoever constructs the models for purposes of transient stability analysis. However, the unknown impedances (such as the exact impedance of a busbar in a substation) are fairly small/negligible and their addition to the model will not substantively change the dynamics or stability result predicted by the model.

As a result, as shown in FIG. 14, the inverter network frequency dynamics are effectively subject to a virtual star network topology 508, with the total load at the center 510 of the star. If an inverter's L-C-L filter inductance is non-negligible compared to its virtual reactance, it may be compensated for by decreasing the virtual reactance. It should be noted that, through use of the advanced GFM control technique of fast filter capacitor voltage regulation, the first inductor in the inverter L-C-L filter can be made invisible to dynamic interactions below the voltage regulator bandwidth.

In such embodiments, as shown in FIG. 14, the virtual star topology 508 can be used by a centralized controller as a basis for one or more power flow and energy function equations, which would in turn be used to determine provably-stable control parameters for the GFM IBR, including, e.g., virtual reactance, virtual inertia, and/or power reserve headroom.

In another embodiment, in place of a centralized controller, the DTVI algorithm 406 may include a distributed control technique in which a sparse communication network links each GFM IBR with at least one other GFM inverter. This communication network is configured to allow the IBR controllers to share their current selection of control parameters with their neighbors, which would in turn allow each IBR controller to iteratively apply the power flow and energy function equations similar to those used by the centralized controller. In such embodiments, the IBR controllers eventually arrive at a consensus for provably-stable parameters such as, e.g., virtual reactance, virtual inertia, and/or power reserve headroom of each IBR.

For purposes of power limit analysis and loss-of-synchronism analysis, in an embodiment, the virtual star topology 508 is ultimately transformed to a Kron-reduced virtual susceptance network 512 as shown in FIG. 15. In particular, as shown in FIG. 15, a Kron-reduced virtual susceptance network 512 used for energy function and power limiting calculations is illustrated, showing the respective power reserves (e.g., SR1, SR2, SR3, and SR4) of the IBRs 502, with the dashed lines 514 indicative of the sparse, low-bandwidth communication network. Thus, exploiting the virtual star topology 508, the DTVI algorithm 406 described herein uses one or more energy functions and Kron reduction calculations to determine (i) transient virtual reactance and the (ii) minimum power reserves that limit the worst-case active and reactive power output and prevents loss of synchronism between any two GFM IBRs. Accordingly, the DTVI algorithm 406 involves the application of power flow and energy function equations to the predictable virtual-impedance-based network to ensure that the selected parameters appropriately (a) limit the power flow from each IBR and (b) allow for continued synchronism between the IBRs and/or between the IBRs and the power grid. DTVI therefore provides a distributed control technique to provide (i) transient dynamics that are provably stable at scale, using an energy function (e.g., a Lyapunov function); and (ii) a minimal need for curtailment of the IBR to achieve provably stable dynamics.

The DTVI algorithm 406 of the present disclosure is described in more detail herein below. In particular, the DTVI algorithm 406 uses power flow and energy function equation(s) to determine the virtual reactance control parameter and the available power reserve for each of the inverter-based resources.

For example, in an embodiment, the DTVI algorithm 406 can be understood with respect to Equations (5)-(8) as set forth below. In particular, in an embodiment, a constant-impedance approximation of the worst-case active power load that can be sustained in the steady-state is given by $R_{ML}=E_i^2/(\Sigma_{j=1}^n P_{Mi})$. Thus, in an embodiment, it is assumed that the active power threshold at which $X_{vi}$ is activated is set marginally above the operating point of each GFM IBR such that a worst case active power step $R_{ML}$ will activate all $X_v$ with high certainty. When virtual impedance is activated, the relative frequency dynamics of GFM IBR i, with respect to the center of angle and center of frequency of the GFM IBR network, are given by Equations (5) and (6) below:

$$\frac{d\omega_i}{dt} = \frac{m_{fi}}{\tau_i}\left(P_{0i} - \sum_{j=1,\neq i}^{n} E_i E_j B_{ij} \sin(\delta_i - \delta_j)\right) - \frac{1}{\sum_{j=1}^{n} \frac{\tau_j}{m_{fj}}}\left(\sum_{j=1}^{n} P_{0j}\right) \quad \text{Equation (5)}$$

$$\frac{d\delta_i}{dt} = \omega_i \quad \text{Equation (6)}$$

where n is the number of GFM IBRs in the network;
$P_{0i}$ is the active power setpoint of GFM $IBR_i$;
$P_{Mi}$ is the maximum active power capability of GFM $IBR_i$ determined using a power reserve calculation;
$X_{vi}$ is the virtual reactance of source i;
B is the network-wide Kron-reduced virtual susceptance matrix;
G is the network-wide Kron-reduced conductance matrix that may include auxiliary loads;
$v_i = E_i \angle \delta_i = $ i=instantaneous voltage at GFM node i;
$\delta_{ij}$ is the voltage angle between GFM IBRs i and j;
$\delta_i^s$ is the stable post-disturbance equilibrium voltage angle of GFM $IBR_i$;
$\tau_i$ is the low-pass filter time constant of GFM $IBR_i$; and
$m_{fi}$=P–ω droop slope of GFM Using a slow, sparse, communication framework, during normal (non-power-limit) operation, GFM $IBR_i$ receives a shared, timestamped matrix of GFM IBR parameters and updates its own matrix accordingly. The shared parameter matrix K includes, for all GFM IBRs in the network, the most recent updates to the following parameters: $X_v$, $P_0$, $P_M$, $\tau$, $m_f$, E.

At every timestep of the slow communication framework, GFM $IBR_i$ uses all $X_v$ entries of the most recent parameter matrix K to calculate the Kron-reduced virtual susceptance matrix B, and the $P_M$ entries to calculate $R_{ML}$ and then G. GFM $IBR_i$ then uses row i of B to calculate the simple summation $P_{MT}$, representing maximum possible active power drawn from GFM $IBR_i$ during a worst-case disturbance, as set forth in Equation (7) below:

$$P_{MTi} = \Sigma_{j=1,\neq i}^{n} E_j E_i B_{ij} + E_i^2 G_{ii} \leq P_{Mi} \quad \text{Equation (7)}$$

If $P_{Mi} \leq P_{MTi}$, GFM $IBR_i$ incrementally raises the value of the $X_{vi}$ entry of the parameter matrix K, timestamps the update and propagates this update to its neighbors in the next timestep. Otherwise, if $P_{Mi} > P_{MTi}$, the $X_{vi}$ entry in matrix K is held constant. Eventually, $X_v$ will converge.

Using parameter matrix K, the pre- and post-disturbance stable equilibrium points of the network GFM IBR dynamics (1) are calculated by GFM $IBR_i$. The network pre-disturbance network energy, $V_0$, is then calculated using a function such as Equation (8) below. $V_0$ is calculated using the pre-disturbance equilibrium states $\delta_i$, $\omega_i$, with respect to post-disturbance equilibrium states, denoted by $\delta^s$, $\omega^s$. Since ω and $\omega^s$ are defined relative to the system center-of-angle, frequency states should be zero if the system is in equilibrium. Additionally, $X_{vi}$ is activated based on a fast, minimally-filtered power calculation, and $X_{vi}$ is triggered immediately after the disturbance. Since the frequency command changes slowly, based on low-pass-filtered power, the relative frequency states will still be equal to zero immediately after the disturbance and application of $X_{vi}$. The unstable equilibrium points with respect to post-disturbance stable equilibrium $\delta^s$ are identified using the network potential energy function, given by the second two terms of Equation (8). The critical energy, $V_C$, is given by the energy of the lowest-energy unstable equilibrium point. While the Lyapunov function (Equation (8)) neglects voltage dynamics, its existence alone demonstrates that the proposed active power limit mode is, by itself, Lyapunov stable. Other energy functions or Lyapunov functions, besides (8), can be used for purposes of determining the stability of the post-disturbance network.

$$V = \sum_{i=1}^{n} \frac{1}{2}\left(\frac{\tau_i}{m_{fi}}\right)\omega_i^2 - \sum_{i=1}^{n}(P_{0i} - E_i^2 G_{ii})[\delta_i - \delta_i^s] - \sum_{i=1}^{n-1}\sum_{j=i+1}^{n}[E_i E_j B_{ij}(\cos \delta_{ij} - \cos \delta_{ij}^s)] \quad \text{Equation (8)}$$

If $V_0 < V_C$, the system loss-of-synchronism is guaranteed not to happen for any of the GFM IBRs while the virtual reactance remains active immediately after the conclusion of the maximum possible active power disturbance, which is the desired result. If $V_0 > V_C$, then loss of synchronism may or may not happen, depending upon the trajectory of the system and the amount of damping present within the system. A larger amount of virtual damping, defined by $$\sum_{j=1}^{n} \frac{1}{m_{fi}},$$

may also reduce the likelihood of a loss of synchronism event. A larger amount of virtual reactance in any of the IBRs has the potential to decrease $V_C$. A larger power reserve margin for any GFM IBR has the potential to decrease $V_0$. If $V_0 > V_C$, then GFM IBR incrementally increases its power reserve by incrementally decreasing the value of the $P_{0i}$ entry of the parameter matrix K, timestamps the update and propagates this update to its neighbors in the next timestep.

To deactivate the virtual impedance, once GFM $IBR_i$ has reached the locally-calculated steady state, the voltage angle is smoothly ramped to a calculated new equilibrium value as virtual impedance is smoothly decreased. A similar threshold-based virtual reactance algorithm can also be applied to the reactive power during momentary fault events, assuming no change in the active load during the event.

Figure 16:
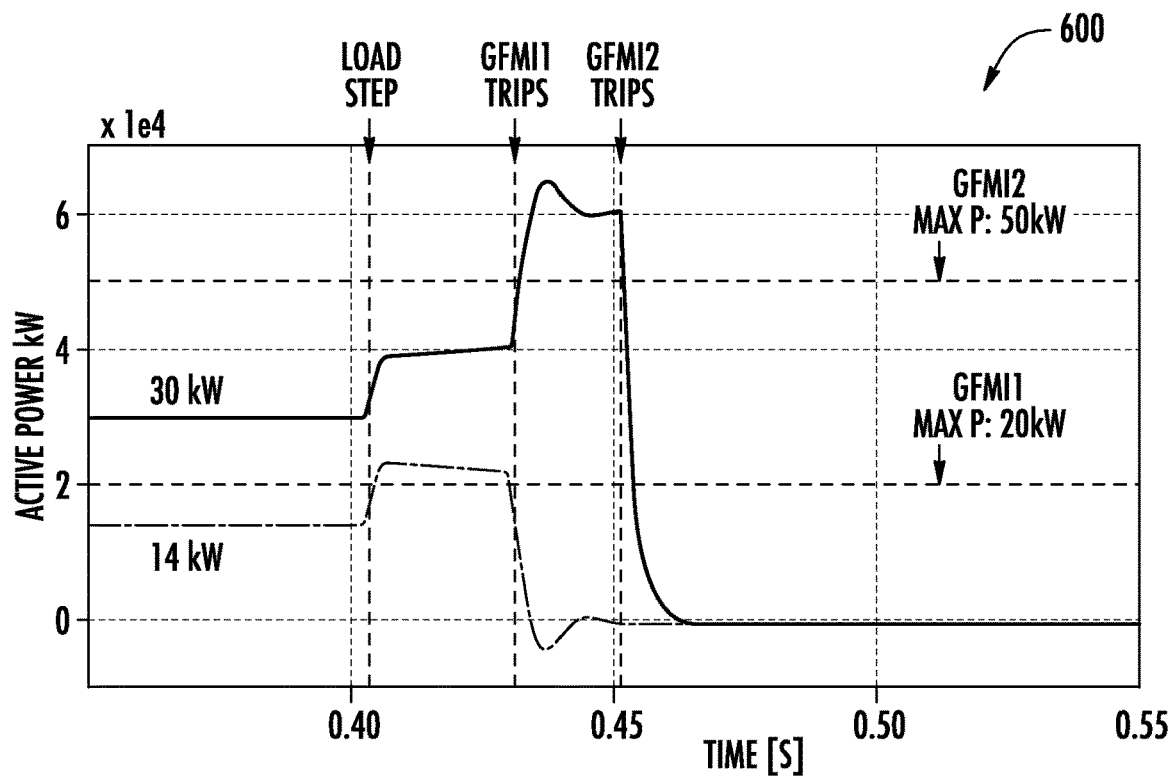
FIG. 16 illustrates a graph of an embodiment of active power (y-axis) versus time (x-axis) of a first inverter-based resource tripping after a transient event due to insufficient power reserve causing the cascaded failure of a second inverter-based resource as the second inverter-based resource picks up the first inverter-based resource's load according to conventional construction.
Figure 17:
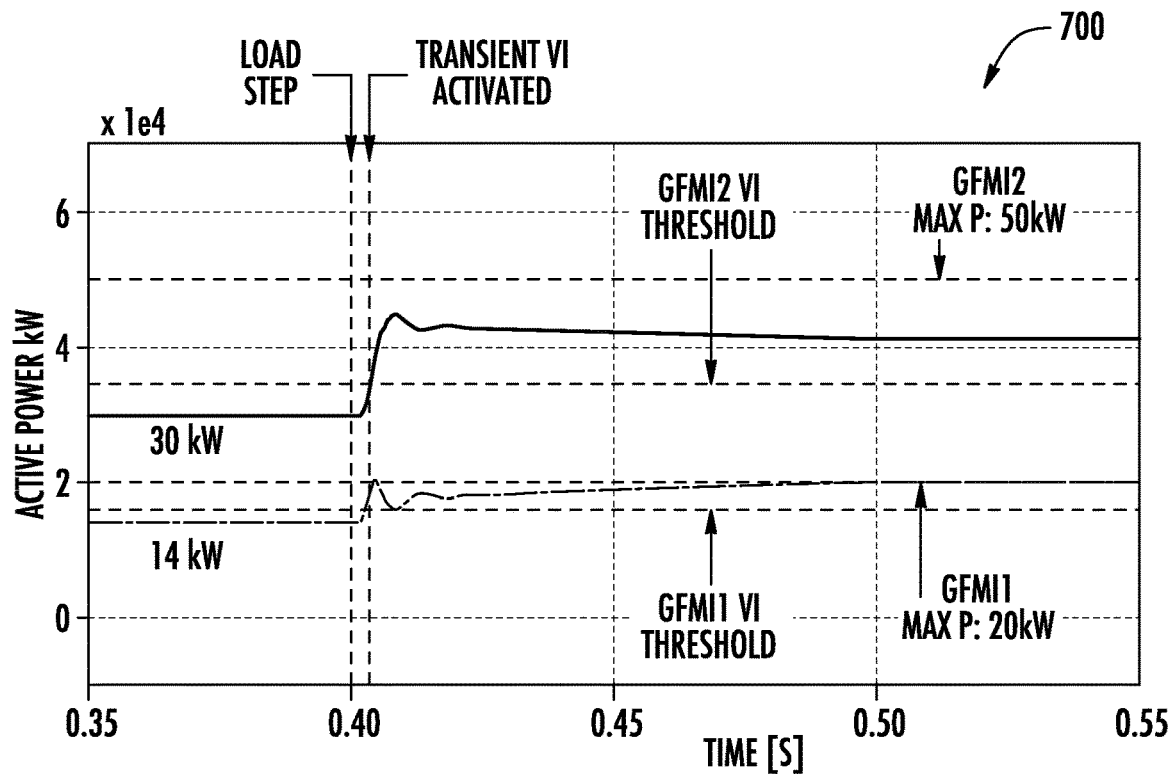
FIG. 17 illustrates a graph of an embodiment of active power (y-axis) versus time (x-axis) of first and second inverter-based resources, particularly illustrating the active power after the distributed transient virtual impedance algorithm according to the present disclosure is activated such that the first and second inverter-based resources survive the transient without increasing the curtailment of the first inverter-based resource.

Referring now to FIGS. 16 and 17, benefits of the DTVI algorithm 406 described herein can be better understood. In particular, FIG. 16 illustrates a graph 600 of an embodiment of active power (y-axis) versus time (x-axis) of first and second IBRs after a transient event without employing the DTVI algorithm 406. FIG. 17 illustrates a graph 700 of an embodiment of active power (y-axis) versus time (x-axis) of the first and second IBRs with employing the DTVI algorithm 406. Thus, as shown, use of the DTVI algorithm 406 described herein improves GFM IBR transient stability. In particular, FIG. 16 illustrates the first IBR (GFMI1) tripping after a transient event due to insufficient power reserve causing the cascaded failure of the second IBR (GFMI2) and it picks up the first IBR's load. In contrast, FIG. 17 illustrates that after the DTVI algorithm 406 is activated, both the first and second GFM IBRs survive the transient event without increasing the curtailment of the first IBR.

Various aspects and embodiments of the present invention are defined by the following numbered clauses:

Clause 1. A method for controlling a network of inverter-based resources connected to a power grid during a disturbance, the method comprising: in response to a start of or in anticipation of the disturbance, employing a distributed transient virtual impedance algorithm among the network of inverter-based resources, wherein the distributed transient virtual impedance algorithm comprises:

determining, via at least one of one or more power flow equations, one or more energy function equations, and one or more estimated power capabilities, a virtual impedance control parameter and a modified power reference for one or more of the inverter-based resources; and activating the virtual impedance control parameter and the modified power reference for one or more of the inverter-based resources to ride through the disturbance in a manner that also optimizes use of the one or more estimated power capabilities for one or more of the inverter-based resources and that preserves synchronism between at least one of at least two of the inverter-based resources and between at least one of the inverter-based resources and the power grid, wherein the virtual impedance control parameter temporarily reduces voltage proportionally with output current for one or more of the inverter-based resources, thereby resulting in a reduction of local power output of one or more of the inverter-based resources.

Clause 2. The method of clause 1, wherein a combined magnitude of an effective grid-tie impedance of the network of inverter-based resources exceeds approximately 0.01 per-unit during, and also immediately after, the disturbance, and wherein the effective grid-tie impedance of the network of inverter-based resources further comprises the virtual impedance control parameter and any non-negligible actual impedances in series with the virtual impedance control parameter.

Clause 3. The method of clause 2, wherein activating the virtual impedance control parameter and the modified power reference for the one or more of the inverter-based resources further comprises:

applying the virtual impedance control parameter to an output of the one or more of the inverter-based resources such that the combined magnitude of the effective grid-tie impedance of the network of inverter-based resources dwarf any comparatively small and unknown, actual impedances of the network, such that an effective network topology temporarily emerges during and immediately after the disturbance and is composed partially or wholly of known virtual impedances and/or known actual impedances of the network.

Clause 4. The method of clause 3, wherein determining, via at least one of the one or more power flow equations, the one or more energy function equations, and the one or more estimated power capabilities, the virtual impedance control parameter and the modified power reference for the one or more of the inverter-based resources further comprises:

using, by a centralized controller, the effective network topology which temporarily emerges during and immediately after the disturbance as a basis for at least one of the one or more power flow equations, the one or more energy function equations, and the one or more estimated power capabilities to determine the virtual impedance control parameter and the modified power reference for the one or more of the inverter-based resources.

Clause 5. The method of clause 4, wherein the effective network topology which temporarily emerges during and immediately after the disturbance is effectively a virtual star topology defining a load of the network during the disturbance being applied at a center of the virtual star topology.

Clause 6. The method of clause 5, further comprising transforming the virtual star topology to a Kron-reduced virtual admittance network topology.

Clause 7. The method of clause 5, further comprising stably allocating an available system-wide power capability to the load of the network during the disturbance.

Clause 8. The method of clause 3, wherein determining, via at least one of the one or more power flow equations, the one or more energy function equations, and the one or more estimated power capabilities, the virtual impedance control parameter and the modified power reference for the one or more of the inverter-based resources further comprises:

using, via a distributed control system, the effective network topology which temporarily emerges during and immediately after the disturbance as a basis for at least one of the one or more power flow equations, the one or more energy function equations, and the one or more estimated power capabilities to determine the virtual impedance control parameter and the modified power reference for the one or more of the inverter-based resources, wherein each of the inverter-based resources communicate with at least one other source using one or more sparse communication network links of the distributed control system to share respective current selections of the virtual impedance control parameter and the modified power reference with each other.

Clause 9. The method of clause 8, wherein the one or more of the inverter-based resources iteratively apply at least one of the one or more power flow equations, the one or more energy function equations, and the one or more estimated power capabilities to determine each of the virtual impedance control parameter and the modified power reference for the one or more inverter-based resources.

Clause 10. The method of any of the preceding clauses, wherein at least one of the one or more power flow equations and the one or more energy function equations comprise, at least, a Lyapunov function.

Clause 11. The method of any of the preceding clauses, wherein the disturbance comprises one of a symmetric or asymmetric line-to-ground or line-to-line fault when islanded or grid-tied, a load step, sag, or swell in a voltage magnitude of the power grid when grid-tied, a load step in a phase angle of the power grid when grid-tied, loss of a distribution or transmission line when islanded or grid-tied, unexpected loss of another significant grid-forming source when islanded or grid-tied, a large step in a constant-power load, constant current load, constant impedance load, or machine load, or combinations thereof when islanded or grid-tied, an unintentional islanding event, and/or an unintentional synchronization event.

Clause 12. The method of any of the preceding clauses, wherein the inverter-based resources are one of a wind turbine, an energy storage system, or a solar power system.

Clause 13. A system for controlling a network of inverter-based resources connected to a power grid during a disturbance, the system comprising:

a control system comprising at least one processor, the at least one processor configured to perform a plurality of operations, the plurality of operations comprising: in response to a start of or in anticipation of the disturbance, employing a distributed transient virtual impedance algorithm among the network of inverter-based resources, wherein the distributed transient virtual impedance algorithm comprises:

determining, via at least one of one or more power flow equations, one or more energy function equations, and one or more estimated power capabilities, a virtual impedance control parameter and a modified power reference for one or more of the inverter-based resources; and activating the virtual impedance control parameter and the modified power reference for one or more of the inverter-based resources to ride through the disturbance in a manner that also optimizes use of the one or more estimated power capabilities for one or more of the inverter-based resources and that preserves synchronism between at least one of at least two of the inverter-based resources and between at least one of the inverter-based resources and the power grid, wherein the virtual impedance control parameter temporarily reduces voltage proportionally with output current for one or more of the inverter-based resources, thereby resulting in a reduction of local power output of one or more of the inverter-based resources.

Clause 14. The system of clause 13, wherein a combined magnitude of an effective grid-tie impedance of the network of inverter-based resources exceeds approximately 0.01 per-unit during, and also immediately after, the disturbance, and wherein the effective grid-tie impedance of the network of inverter-based resources further comprises the virtual impedance control parameter and any non-negligible actual impedances in series with the virtual impedance control parameter.

Clause 15. The system of clause 14, wherein activating the virtual impedance control parameter and the modified power reference for the one or more of the inverter-based resources further comprises:

applying the virtual impedance control parameter to an output of the one or more of the inverter-based resources such that the combined magnitude of the effective grid-tie impedance of the network of inverter-based resources dwarf any comparatively small and unknown, actual impedances of the network, such that an effective network topology temporarily emerges during and immediately after the disturbance and is composed partially or wholly of known virtual impedances and/or known actual impedances of the network.

Clause 16. The system of clause 15, wherein the control system comprises a centralized controller, wherein determining, via at least one of the one or more power flow equations, the one or more energy function equations, and the one or more estimated power capabilities, the virtual impedance control parameter and the modified power reference for the one or more of the inverter-based resources further comprises:

using, by the centralized controller, the effective network topology which temporarily emerges during and immediately after the disturbance as a basis for at least one of the one or more power flow equations, the one or more energy function equations, and the one or more estimated power capabilities to determine the virtual impedance control parameter and the modified power reference for the one or more of the inverter-based resources.

Clause 17. The system of clause 16, wherein the effective network topology is effectively a virtual star topology defining a load of the network during the disturbance being applied at a center of the virtual star topology.

Clause 18. The system of clause 17, wherein the plurality of operations further comprise transforming the virtual star topology to a Kron-reduced virtual admittance network topology.

Clause 19. The system of clauses 17-18, wherein the plurality of operations further comprise stably allocating an available system-wide power capability to the load of the network during the disturbance.

Clause 20. The system of clauses 15-19, wherein the control system is a distributed control system, wherein determining, via at least one of the one or more power flow equations, the one or more energy function equations, and the one or more estimated power capabilities, the virtual impedance control parameter and the modified power reference for the one or more of the inverter-based resources further comprises:

using, via the distributed control system, the effective network topology which temporarily emerges during and immediately after the disturbance as a basis for via at least one of the one or more power flow equations, the one or more energy function equations, and the one or more estimated power capabilities to determine the virtual impedance control parameter and the modified power reference for the one or more the inverter-based resources, wherein each of the inverter-based resources communicate with at least one other source using one or more sparse communication network links of the distributed control system to share respective current selections of the virtual impedance control parameter and the modified power reference with each other.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a network of inverter-based resources connected to a power grid during a disturbance, the method comprising:

in response to a start of or in anticipation of the disturbance, employing a distributed transient virtual impedance algorithm among the network of inverter-based resources, wherein the distributed transient virtual impedance algorithm comprises:

determining, via at least one of one or more power flow equations, one or more energy function equations, and one or more estimated power capabilities, a virtual impedance control parameter and a modified power reference for one or more of the inverter-based resources; and activating the virtual impedance control parameter and the modified power reference for one or more of the inverter-based resources to ride through the disturbance in a manner that also optimizes use of the one or more estimated power capabilities for one or more of the inverter-based resources and that preserves synchronism between at least one of at least two of the inverter-based resources and between at least one of the inverter-based resources and the power grid, wherein the virtual impedance control parameter temporarily reduces voltage proportionally with output current for one or more of the inverter-based resources, thereby resulting in a reduction of local power output of one or more of the inverter-based resources.

2. The method of claim 1, wherein a combined magnitude of an effective grid-tie impedance of the network of inverter-based resources exceeds approximately 0.01 per-unit during, and also immediately after, the disturbance, and wherein the effective grid-tie impedance of the network of inverter-based resources further comprises the virtual impedance control parameter and any non-negligible actual impedances in series with the virtual impedance control parameter.

3. The method of claim 2, wherein activating the virtual impedance control parameter and the modified power reference for the one or more of the inverter-based resources further comprises:
applying the virtual impedance control parameter to an output of the one or more of the inverter-based resources such that the combined magnitude of the effective grid-tie impedance of the network of inverter-based resources dwarf any comparatively small and unknown, actual impedances of the network, such that an effective network topology temporarily emerges during and immediately after the disturbance and is composed partially or wholly of known virtual impedances and/or known actual impedances of the network.

4. The method of claim 3, wherein determining, via at least one of the one or more power flow equations, the one or more energy function equations, and the one or more estimated power capabilities, the virtual impedance control parameter and the modified power reference for the one or more of the inverter-based resources further comprises:
using, by a centralized controller, the effective network topology which temporarily emerges during and immediately after the disturbance as a basis for at least one of the one or more power flow equations, the one or more energy function equations, and the one or more estimated power capabilities to determine the virtual impedance control parameter and the modified power reference for the one or more of the inverter-based resources.

5. The method of claim 4, wherein the effective network topology which temporarily emerges during and immediately after the disturbance is effectively a virtual star topology defining a load of the network during the disturbance being applied at a center of the virtual star topology.

6. The method of claim 5, further comprising transforming the virtual star topology to a Kron-reduced virtual admittance network topology.

7. The method of claim 5, further comprising stably allocating an available system-wide power capability to the load of the network during the disturbance.

8. The method of claim 3, wherein determining, via at least one of the one or more power flow equations, the one or more energy function equations, and the one or more estimated power capabilities, the virtual impedance control parameter and the modified power reference for the one or more of the inverter-based resources further comprises:
using, via a distributed control system, the effective network topology which temporarily emerges during and immediately after the disturbance as a basis for at least one of the one or more power flow equations, the one or more energy function equations, and the one or more estimated power capabilities to determine the virtual impedance control parameter and the modified power reference for the one or more of the inverter-based resources, wherein each of the inverter-based resources communicate with at least one other source using one or more sparse communication network links of the distributed control system to share respective current selections of the virtual impedance control parameter and the modified power reference with each other.

9. The method of claim 8, wherein the one or more of the inverter-based resources iteratively apply at least one of the one or more power flow equations, the one or more energy function equations, and the one or more estimated power capabilities to determine each of the virtual impedance control parameter and the modified power reference for one or more of the inverter-based resources.

10. The method of claim 1, wherein at least one of the one or more power flow equations and the one or more energy function equations comprise, at least, a Lyapunov function.

11. The method of claim 1, wherein the disturbance comprises one of a symmetric or asymmetric line-to-ground or line-to-line fault when islanded or grid-tied, a load step, sag, or swell in a voltage magnitude of the power grid when grid-tied, a load step in a phase angle of the power grid when grid-tied, loss of a distribution or transmission line when islanded or grid-tied, unexpected loss of another significant grid-forming source when islanded or grid-tied, a large step in a constant-power load, constant current load, constant impedance load, or machine load, or combinations thereof when islanded or grid-tied, an unintentional islanding event, and/or an unintentional synchronization event.

12. The method of claim 1, wherein the inverter-based resources are one of a wind turbine, an energy storage system, or a solar power system.

13. A system for controlling a network of inverter-based resources connected to a power grid during a disturbance, the system comprising:
a control system comprising at least one processor, the at least one processor configured to perform a plurality of operations, the plurality of operations comprising:
in response to a start of or in anticipation of the disturbance, employing a distributed transient virtual impedance algorithm among the network of inverter-based resources, wherein the distributed transient virtual impedance algorithm comprises:
determining, via at least one of one or more power flow equations, one or more energy function equations, and one or more estimated power capabilities, a virtual impedance control parameter and a modified power reference for one or more of the inverter-based resources; and
activating the virtual impedance control parameter and the modified power reference for one or more of the inverter-based resources to ride through the disturbance in a manner that also optimizes use of the one or more estimated power capabilities for one or more of the inverter-based resources and that preserves synchronism between at least one of at least two of the inverter-based resources and between at least one of the inverter-based resources and the power grid, wherein the virtual impedance control parameter temporarily reduces voltage proportionally with output current for one or more of the inverter-based resources, thereby resulting in a reduction of local power output of one or more of the inverter-based resources.

14. The system of claim 13, wherein a combined magnitude of an effective grid-tie impedance of the network of inverter-based resources exceeds approximately 0.01 per-unit during, and also immediately after, the disturbance, and wherein the effective grid-tie impedance of the network of inverter-based resources further comprises the virtual impedance control parameter and any non-negligible actual impedances in series with the virtual impedance control parameter.

15. The system of claim 14, wherein activating the virtual impedance control parameter and the modified power reference for the one or more of the inverter-based resources further comprises:

applying the virtual impedance control parameter to an output of the one or more of the inverter-based resources such that the combined magnitude of the effective grid-tie impedance of the network of inverter-based resources dwarf any comparatively small and unknown, actual impedances of the network, such that an effective network topology temporarily emerges during and immediately after the disturbance and is composed partially or wholly of known virtual impedances and/or known actual impedances of the network.

16. The system of claim 15, wherein the control system comprises a centralized controller, wherein determining, via at least one of the one or more power flow equations, the one or more energy function equations, and the one or more estimated power capabilities, the virtual impedance control parameter and the modified power reference for the one or more of the inverter-based resources further comprises:

using, by the centralized controller, the effective network topology which temporarily emerges during and immediately after the disturbance as a basis for at least one of the one or more power flow equations, the one or more energy function equations, and the one or more estimated power capabilities to determine the virtual impedance control parameter and the modified power reference for the one or more of the inverter-based resources.

17. The system of claim 16, wherein the effective network topology is effectively a virtual star topology defining a load of the network during the disturbance being applied at a center of the virtual star topology.

18. The system of claim 17, wherein the plurality of operations further comprise transforming the virtual star topology to a Kron-reduced virtual admittance network topology.

19. The system of claim 17, wherein the plurality of operations further comprise stably allocating an available system-wide power capability to the load of the network during the disturbance.

20. The system of claim 15, wherein the control system is a distributed control system, wherein determining, via at least one of the one or more power flow equations, the one or more energy function equations, and the one or more estimated power capabilities, the virtual impedance control parameter and the modified power reference for the one or more of the inverter-based resources further comprises:

using, via the distributed control system, the effective network topology which temporarily emerges during and immediately after the disturbance as a basis for via at least one of the one or more power flow equations, the one or more energy function equations, and the one or more estimated power capabilities to determine the virtual impedance control parameter and the modified power reference for the one or more the inverter-based resources, wherein each of the inverter-based resources communicate with at least one other source using one or more sparse communication network links of the distributed control system to share respective current selections of the virtual impedance control parameter and the modified power reference with each other.

* * * * *